US011954631B2

(12) United States Patent
Olmino et al.

(10) Patent No.: US 11,954,631 B2
(45) Date of Patent: Apr. 9, 2024

(54) METHOD OF AND SYSTEM FOR ENACTING A BUSINESS PROCESS IN AN EVENT-DRIVEN ENVIRONMENT

(71) Applicant: Siemens Aktiengesellschaft, Munich (DE)

(72) Inventors: Paolo Olmino, Genua (IT); Fabrizio Camera, Serravalle Scrivia (IT); Marco Mazzarone, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 74 days.

(21) Appl. No.: 17/286,551

(22) PCT Filed: Sep. 24, 2019

(86) PCT No.: PCT/EP2019/075620
§ 371 (c)(1),
(2) Date: Apr. 19, 2021

(87) PCT Pub. No.: WO2020/078674
PCT Pub. Date: Apr. 23, 2020

(65) Prior Publication Data
US 2021/0383303 A1    Dec. 9, 2021

(30) Foreign Application Priority Data
Oct. 17, 2018    (EP) .................... 18200886

(51) Int. Cl.
*G06Q 10/00*    (2023.01)
*G06F 8/35*    (2018.01)
(Continued)

(52) U.S. Cl.
CPC ......... *G06Q 10/06375* (2013.01); *G06F 8/35* (2013.01); *G06F 8/70* (2013.01); *G06Q 10/067* (2013.01)

(58) Field of Classification Search
CPC .......... G06Q 10/06375; G06Q 10/067; G06Q 10/06; G06F 8/35; G06F 8/70; G06F 8/10
See application file for complete search history.

(56) References Cited

U.S. PATENT DOCUMENTS

| 7,512,454 | B1 * | 3/2009 | Li | ......................... G06Q 10/06 700/97 |
| 8,453,127 | B2 * | 5/2013 | Balko | ..................... G06F 9/546 |

(Continued)

FOREIGN PATENT DOCUMENTS

| EP | 1577757 A2 * | 9/2005 | ............... G06F 8/10 |
| EP | 2431929 A1 * | 3/2012 | ............. G06Q 10/06 |

OTHER PUBLICATIONS

Colombo, Armando W., et al. "Service-oriented SCADA and MES supporting petri nets based orchestrated automation systems." IECON 2012—38th Annual Conference on IEEE Industrial Electronics Society. IEEE (Year: 2012).*

(Continued)

*Primary Examiner* — Rutao Wu
*Assistant Examiner* — Tyrone E Singletary
(74) *Attorney, Agent, or Firm* — Laurence A. Greenberg; Werner H. Stemer; Ralph E. Locher

(57) ABSTRACT

A business process is enacted in a production facility employing a computer managed manufacturing execution system or manufacturing operation management system. The MES/MOM systems operate in an event-driven environment based on handlers orchestrated by events. The method includes: providing and parsing a business process model; creating precompiled, closed source command handlers and event handlers; creating entities of a work process model in an operational domain of the system; and, based on the work process model, running a work process, instancing the business process, by using the precompiled, closed source command handlers and event handlers, the command (Continued)

handlers working on tokens that are differentiated for the different types of elements, are created by the command handlers for each element in a run provided for by the enactment and, for each element, are differentiated according to whether the run to which the token belongs is actually executed or skipped.

11 Claims, 18 Drawing Sheets

(51) Int. Cl.
*G06F 8/70* (2018.01)
*G06Q 10/0637* (2023.01)
*G06Q 10/067* (2023.01)

(56) References Cited

U.S. PATENT DOCUMENTS

| | | | | |
|---|---|---|---|---|
| 8,849,747 | B2* | 9/2014 | Balko | G06Q 10/067 707/602 |
| 2012/0159640 | A1* | 6/2012 | Cox | G06F 21/335 726/27 |
| 2013/0139164 | A1* | 5/2013 | Balko | G06Q 10/06 718/102 |
| 2013/0238384 | A1* | 9/2013 | Caesar | G06F 8/34 705/7.27 |
| 2014/0020080 | A1* | 1/2014 | Antypas, III | G06F 21/6218 726/9 |
| 2015/0378357 | A1* | 12/2015 | Vecchio | G05B 19/41865 700/99 |
| 2016/0154913 | A1* | 6/2016 | Altare | G06Q 10/06 703/13 |
| 2018/0059654 | A1* | 3/2018 | Lombardi | G06F 9/546 |
| 2019/0012151 | A1* | 1/2019 | Holbrook | G06F 8/65 |

OTHER PUBLICATIONS

Armando W Colombo et al, "Service-oriented SCADA and MES supporting Petri nets based orchestrated automation systems", IECON 2012—38th Annual Conference on IEEE Industrial Electronics Society, IEEE, Oct. 25, 2012 (Oct. 25, 2012), p. 6144-6150, XP032281405, DOI: 10.1109/IECON.2012.6389076 external link, ISBN: 9781467324199.

Yang, Yan et al, "A distributed approach to automated manufacturing systems with complex structures using Petri hets", 2017 IEEE International Conference on Robotics and Automation (ICRA), IEEE, May 29, 2017 (May 29, 2017), p. 3016-3023, XP033127088, DOI: 10.1109/ICRA.2017.7989346.

Chavan Vishwajit et al, "Modeling and Simulation of a Manufacturing System by Using Time Petri Net", International Journal of Engineering Research and General Science Volume,vol. 4, No. 4, Aug. 1, 2016 (Aug. 1, 2016), p. 308-313, XP055554774.

* cited by examiner

METHOD OF AND SYSTEM FOR ENACTING A BUSINESS PROCESS IN AN EVENT-DRIVEN ENVIRONMENT

BACKGROUND OF THE INVENTION

Field of the Invention

The invention relates to a method of and a system for enacting a business process in a production facility employing computer managed manufacturing execution system (MES) or manufacturing operation management (MOM) system. More particularly, the invention is concerned with enacting a business process in an event-driven environment.

In production facilities employing MES/MOM systems, the activity is often described by means of the so-called Business Processes, which basically are a sequence of steps designed to produce a certain product or service.

Sometimes the number of processes to enact at the same time is very high and calls for reengineering of processes themselves, since systems cannot reach acceptable performance. Besides, Business Processes are not modeled using a program-like, flow-oriented representation such as UML Activity Diagrams, but using forms like BPMN (Business Process Modeling and Notation), which have a more powerful expressivity, but in which however enactment is not possible unless the model is reengineered.

The most usual solution for business process enactment is based on the compiled code technique, according to which the model prepared according to the BPMN specifications is transformed into an executable code. This technique is complex in se, in that it requires compiling, installing and recording executable programs both at the time of defining the BPMN model, and whenever the BPMN is modified. Further, also making available the compiled code to different hosts is a complex operation.

Compilation cannot be dispensed with even in event-driven architectures, i.e. architectures in which the enactment is designed as a chain of events and commands, which are processed by respective handlers. Also in this case, the handlers are to be prepared and compiled for each specific case and at each change in the model.

SUMMARY OF THE INVENTION

It is therefore an aim of the present invention to overcome the above-mentioned drawbacks, by providing a method and a system for enacting a business process in a production facility employing a computer managed manufacturing execution system (MES) or a manufacturing operation management (MOM) system operating in an event-driven environment, which dispenses with the need of compiling a lot of code.

The aforementioned aim is achieved by a method and a system comprising the following steps:
  providing a model of the business process;
  parsing the business process model;
  creating, as a result of the parsing, precompiled, closed source command handlers and event handlers;
  creating entities of a work process model in an operational domain of the system; and
  based on said work process model, running a work process instancing the business process by using said built-in precompiled, closed source command handlers and event handlers, the command handlers working on tokens that are differentiated for the different types of elements in the model, are created by the command handlers for each element in a run provided for by the enactment and, for each element, are differentiated according to whether the run the token belongs to is actually executed or is skipped.

In invention embodiments, differentiation of the tokens according to whether the run a token belongs to is actually executed or is skipped is achieved by attributing each token a different Boolean value.

In invention embodiments, operation control is handed over between event handlers and command handlers at each element in the model.

In invention embodiments, the step of taking a decision on an action to be carried out on tokens at a gateway on the basis of the order of arrival of the tokens at said gateway is further provided for.

In invention embodiments, the step of taking a decision on an action to be carried out on tokens at a gateway on the basis of the Boolean value of the token itself is further provided for.

In invention embodiments, the step of including into each token a code identifying the run the token belongs to is further provided for.

In invention embodiments, the steps of analyzing the Boolean values and the status of the tokens at a converging exclusive gateway, and of consuming tokens belonging to a skipped run and left unconsumed because of the previous arrival of a token belonging to an actually executed run are further provided for.

In invention embodiments, the step of assigning priority to the processing of events concerning change of status of tokens belonging to skipped runs over similar events concerning tokens belonging to actually executed runs is further provided for.

Furthermore, a computer program element can be provided, comprising computer program code for performing steps according to the above mentioned method when loaded in a digital processor of a computing device.

Additionally, a computer program product stored on a computer usable medium can be provided, comprising computer readable program code for causing a computing device to perform the mentioned method.

BRIEF DESCRIPTION OF THE SEVERAL VIEWS OF THE DRAWING

The invention will now be described in preferred but not exclusive embodiments with reference to the accompanying drawings, wherein.

DETAILED DESCRIPTION OF THE INVENTION

Figure 1:
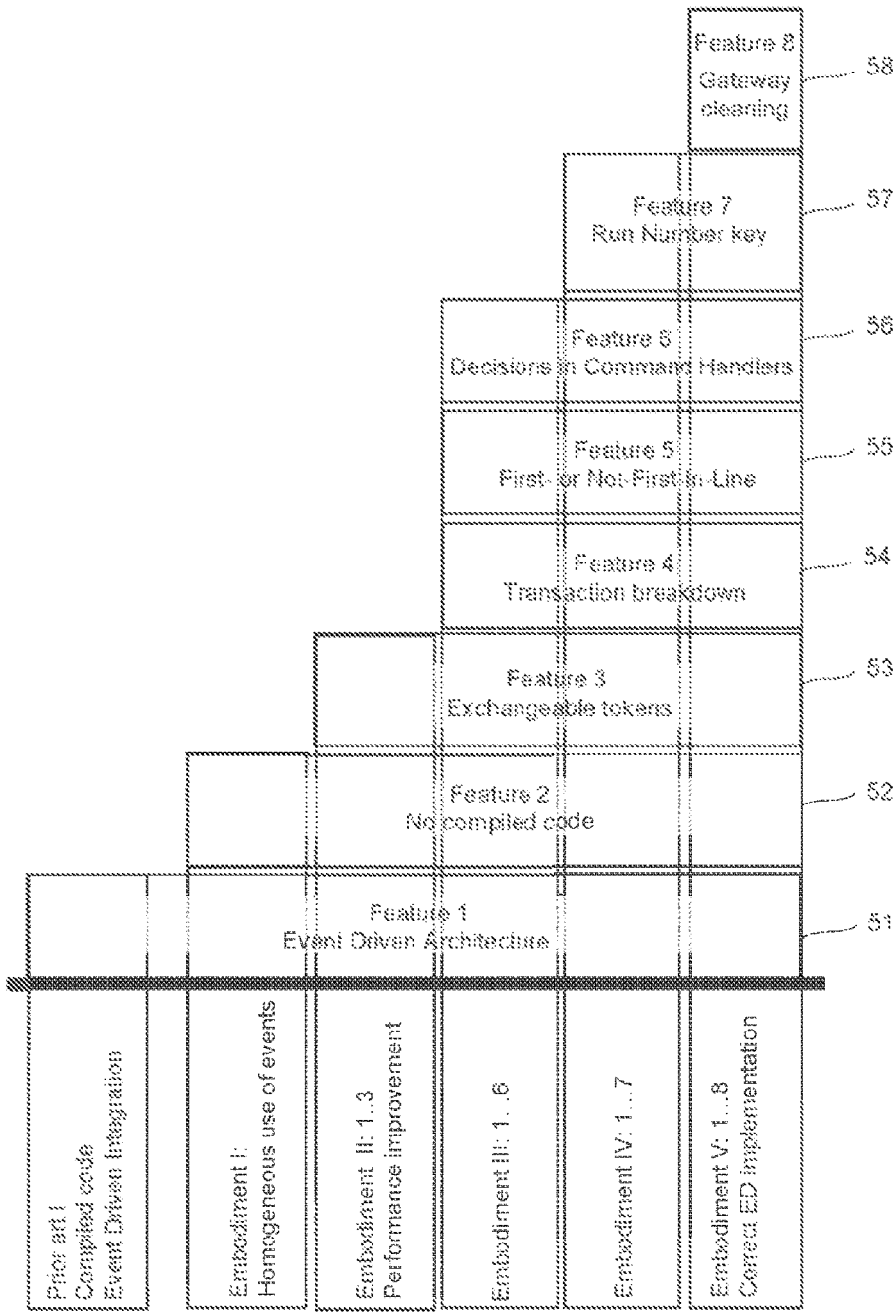
FIG. 1 is a sketch depicting the features of the method of the invention and their possible combinations.

FIG. 1 is a sketch depicting the basic features of the method of the invention and the manners in which they can be exploited (embodiments).

According to the invention, the problem of enactment of the business process is transposed to the scenario of an Event-Driven Architecture (EDA), where the enactment is designed as a chain of events and commands ("saga").

An example of a system employing an event-driven architecture in which the invention can find application is the SIMATIC IT Unified Architecture Foundation (SIT UAF) platform, developed and commercialized by the Applicant.

The model definition transposed in the EDA scenario does not rely on the compiled code technique, but on a set of built-in artifacts in the operational domain: entities (that can persist the state of the enactment), messages (i.e. commands and events), and handlers of two types, hosted in the architecture of the system where the business process is to be enacted (in the example, SIT UAF), namely:

event handlers, which run according to specific system events and are able to read the persistent objects and to call transactions, implemented in command handlers;
command handlers, i.e. routines able to modify the persistent objects and to fire business events.

Transposing the enactment to the EDA environment and eliminating code compilation (features 1 and 2, blocks 51 and in the Figure) represent the basic embodiment of the invention (embodiment I). Moreover, in event-driven architectures, a special design effort must be spent into making handlers stateless, and consequently the access to the persisted state particularly quick and isolated, what is obtained by a specific organization of the tokens (exchangeable tokens, Feature 3, block 53). Thus, the inclusion of such feature provided for by embodiment II results in a substantial performance improvement. Features 4 to 6 (transaction segmentation or breakdown, filtering based on the order of arrival of the tokens and decisions on the token exchange in the EnterElement command handler, blocks 54 to 56, respectively) are useful to solve typical problems posed by the concurrency of small work units and are included in a further embodiment of the invention (embodiment III) together with previous features 1 to 3. A further feature (feature 7, block 57), provides for including the run number into the token key and is included in a fourth embodiment for dealing with some functional problems concerning loopbacks. Inclusion of yet another feature (Feature 8, block 58), providing for cleaning of unconsumed false tokens, results in an embodiment (embodiment V) intended to solve possible problems created by such tokens at exclusive converging gateways. Embodiments IV and V assist in improving performance, in particular in terms of correctness of the implementation in an event driven environment.

Figure 2:
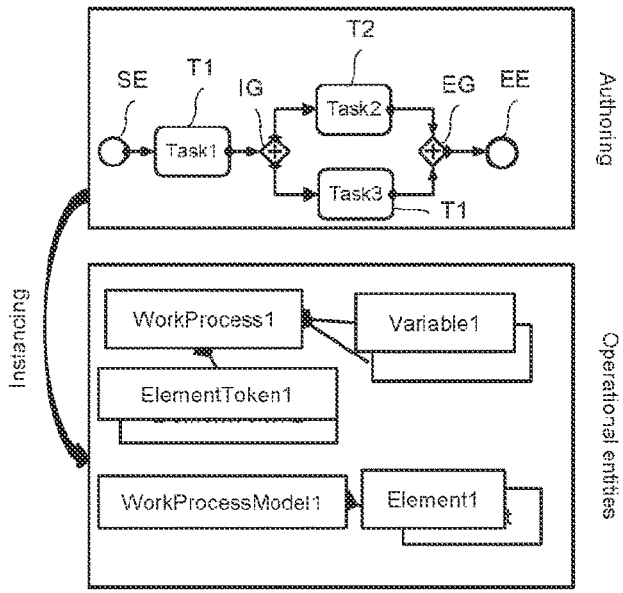
FIG. 2 is a block diagram illustrating the enactment procedure according to the invention.

FIG. 2 shows the principles of the enactment according to the invention, for a very simple exemplary business process including a start and an end event SE and EE, respectively, a diverging and a converging gateway (shown as parallel gateways) IG and EG, respectively, and three tasks T1, T2, T3.

When the system must enact the business process, the BPMN contained in the authoring domain is parsed and transformed into two composite entities residing in the operational domain: the former containing the model information (WorkProcessModel) and the latter containing the runtime status (WorkProcess). The graphical information (diagram) contained in BPMN is not used in enactment.

The core concepts of such a redesign are the use of:
tokens, as a general technique to represent the execution progress, to be refined through features discussed below;
precompiled, closed-source command and event handlers as a general technique to replace the compiled code.

Figure 3:
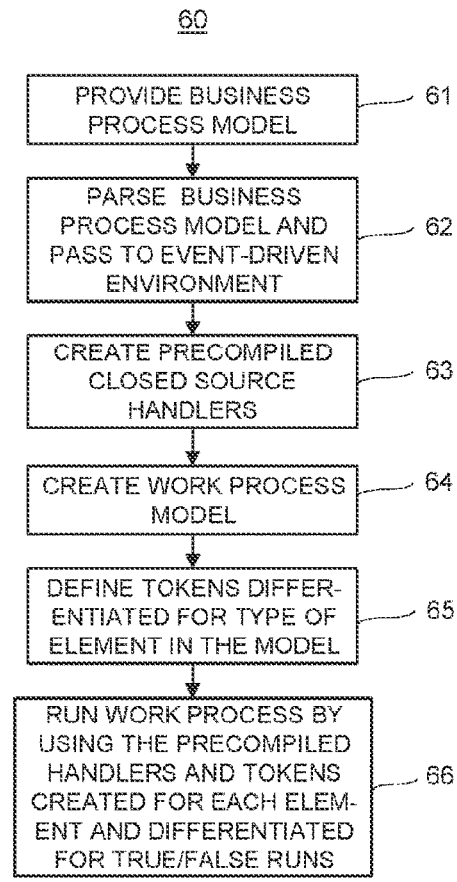
FIG. 3 is a flow chart corresponding to FIG. 2.

FIG. 3 shows the procedure described above in form of a flow chart 60. Step 61 is the provision of the BP to be enacted and step 62 is the parsing, resulting in a work process model 63. Step 64 is the definition, within the model, of tokens differentiated depending on the kind of element to be enacted (sequence flow or flow element), and step 65 is the execution of the work process corresponding to the model by using the precompiled, built-in handlers and by creating tokens for each element.

To expedite and isolate the access to the entities, unlike in conventional approach, tokens do not represent the progress of entire runs but the status of single elements in the run (Element Token): in other words, command handlers create the tokens for the single elements of the business process and change their status on the basis of appropriate events. Clearly, element-wide tokens are more fine-grained and cause less contention than run tokens. Moreover, to further optimize contention, the tokens are distinguished into Sequence Flow tokens and Flow Element tokens. The manner in which such tokens are used will become apparent from the sequel of the description.

Due to the inherent loose coupling of an Event-Driven Architecture, i.e. an architecture based on handlers orchestrated by events, the passage to such architecture affords a whole bunch of benefits in terms of:

maintainability: handlers are loosely coupled and allow maintenance with less impact on other parts and less regression;
horizontal scalability: handlers can be distributed over different hosts;
testability: event handlers can be shunted or short-circuited event: where just integration logic is tested, or just some of the many command handlers;
statelessness: handlers demand little host memory and, when inactive, occupy virtually no resources;
lower level of isolation policy: some architectures, such as SIT UAF, use a low level of isolation policy (snapshot), that allows a higher parallelism;
simulation: virtual copies can substitute for command handlers, not doing the actual actions.
monitoring: subscribing to all relevant events easily poses the bases for a monitoring application;

In turn, the creation of operational artifacts instead of the compilation of machine code not only is a step towards the integration into an Event-Driven architecture, but it provides some benefit on its own in terms of:

- immediateness of enactment starting: the model object can be recycled, the runtime model can be created in milliseconds;
- easiness of enactment starting: handlers implementing business process enactment are just like other handlers, they do not require particular attention from users and operators, such as moving archives (e.g. .jar/.war) between hosts, etc.;
- security: enactment handlers are fully integrated with the architecture, just like other applications, so they are subject to the same security restrictions and do not need a special threat and risk assessment;
- extendibility: since the artifacts are incorporated in an extendible architecture (i.e. users may have the possibility to extend entities with custom properties and business logics with custom pre-actions and post-actions), they benefit of the possibility other artifacts do;
- basis for unbalanced, free-flow constructs: some constructs, such as diverging gateways not matching converging gateways or flow-outs are often not supported by compilers, but can be used in BPMN models (see next advantage).

A refinement of the token, provided for in feature 3, is the use of exchangeable tokens with a Boolean value: "true" when the path containing the token is actually executed; "false" when the path containing the token is practically skipped.

Figure 4:
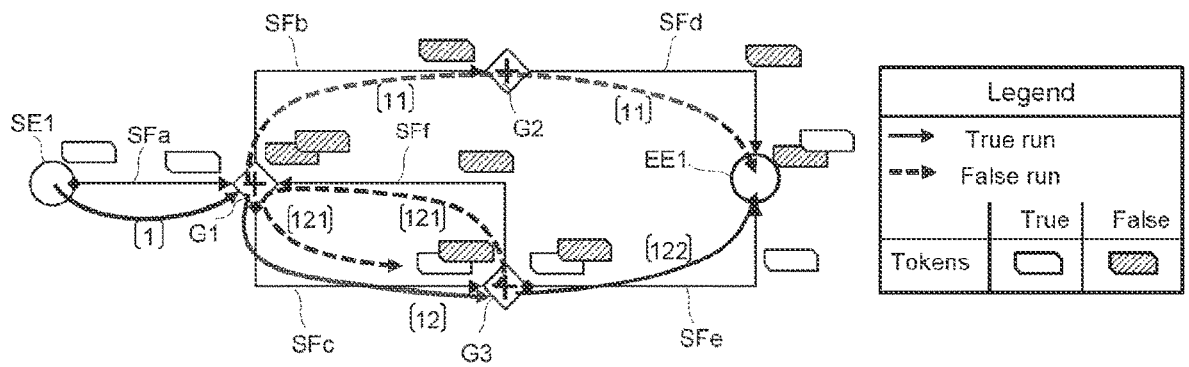
FIGS. 4, 5 are diagrams showing the use of exchangeable tokens with Boolean values.

An example of exchangeable tokens with Boolean values is shown in FIG. 4 for a simple process modeled by starting and end events SE1, EE1, gateways G1, G2, G3 and sequence flows (edges) SFa to SFf connecting the various elements. Diverging gateway G1 gives rise to two branches converging at end event EE1. The first branch includes sequence flow SFb, gateway G2 and sequence flow SFd. The second branch includes sequence flow SFc, gateway G3 and sequence flow SFe, as well as a loop back from G3 to G1. It is assumed that the process demands execution of operations along path SFc, G2, SFe in the lower branch, whereas the upper branch and the loop back are skipped. The runs are indicated by solid thick lines if they are actually executed (true runs) and by broken thick lines if they are not executed (false runs). In each run, a "true" token (shown by a blank box with beveled corners) or a "false" token (shown by a dashed box with beveled corners) is correspondingly generated for each flow element and each sequence flow. So, with the assumed arrangement of true/false runs, it is immediate to see that the true/false tokens are as shown in the Figure. Each run is associated with a run number, indicated between parentheses in the drawings. Denoting by "1" a first run (enactment of SFa) is denoted "1"; the number of any subsequent run is created according to the following general rules: in case of a fork and of a true run, by suffixing the number of the previous run with a digit representing the outgoing edge of the fork; in case of a single possible path and of false runs, by propagating the number of the previous run unchanged. Thus, with the arrangement of true/false runs shown in the Figure, the runs departing from G1 are denoted "11" and "12". Run "11" keeps the same run number up to EE1 since no fork exists at G1. A fork exists at G3, and hence the output runs are numbered "121" and "122". Run "121" is false and hence keeps such number also when proceeding from G1 to G3

Figure 5:
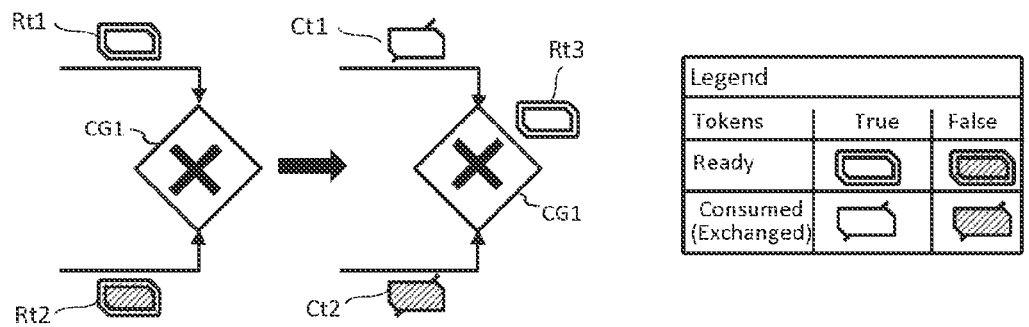
Figure 10:
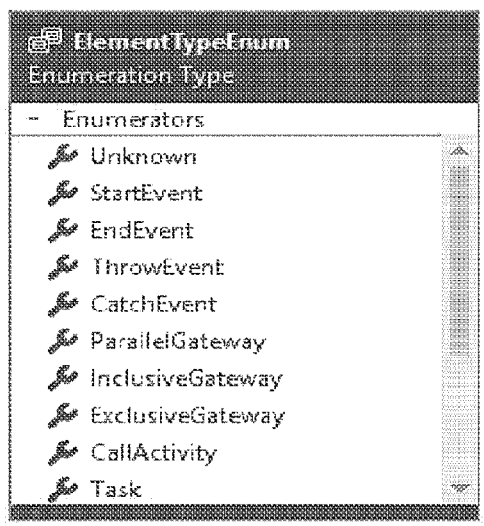
FIGS. 6 to 10 shows the structure of the entities, commands and events involved in the enactment in an exemplary application of the invention.
Figure 6:
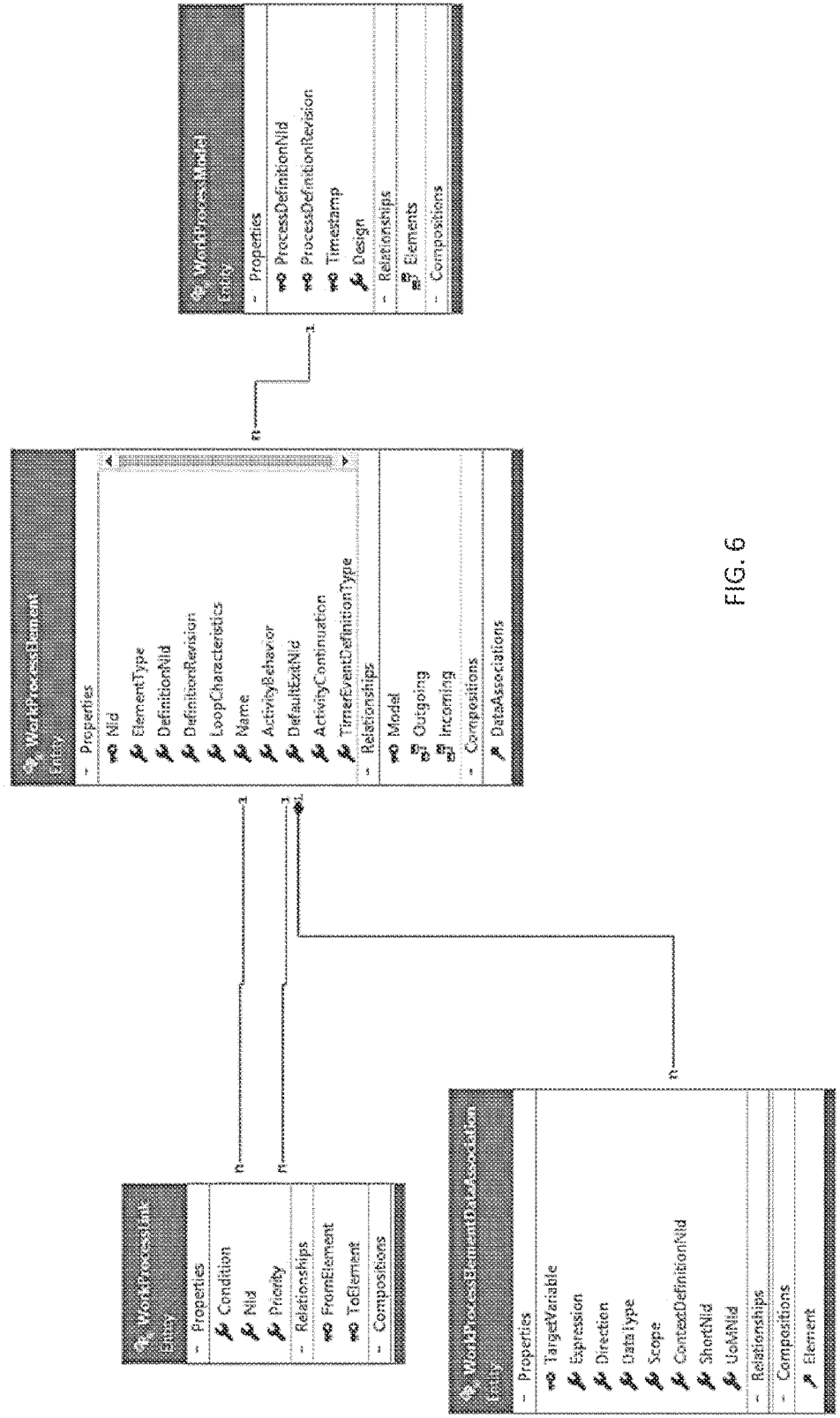
Figure 7:
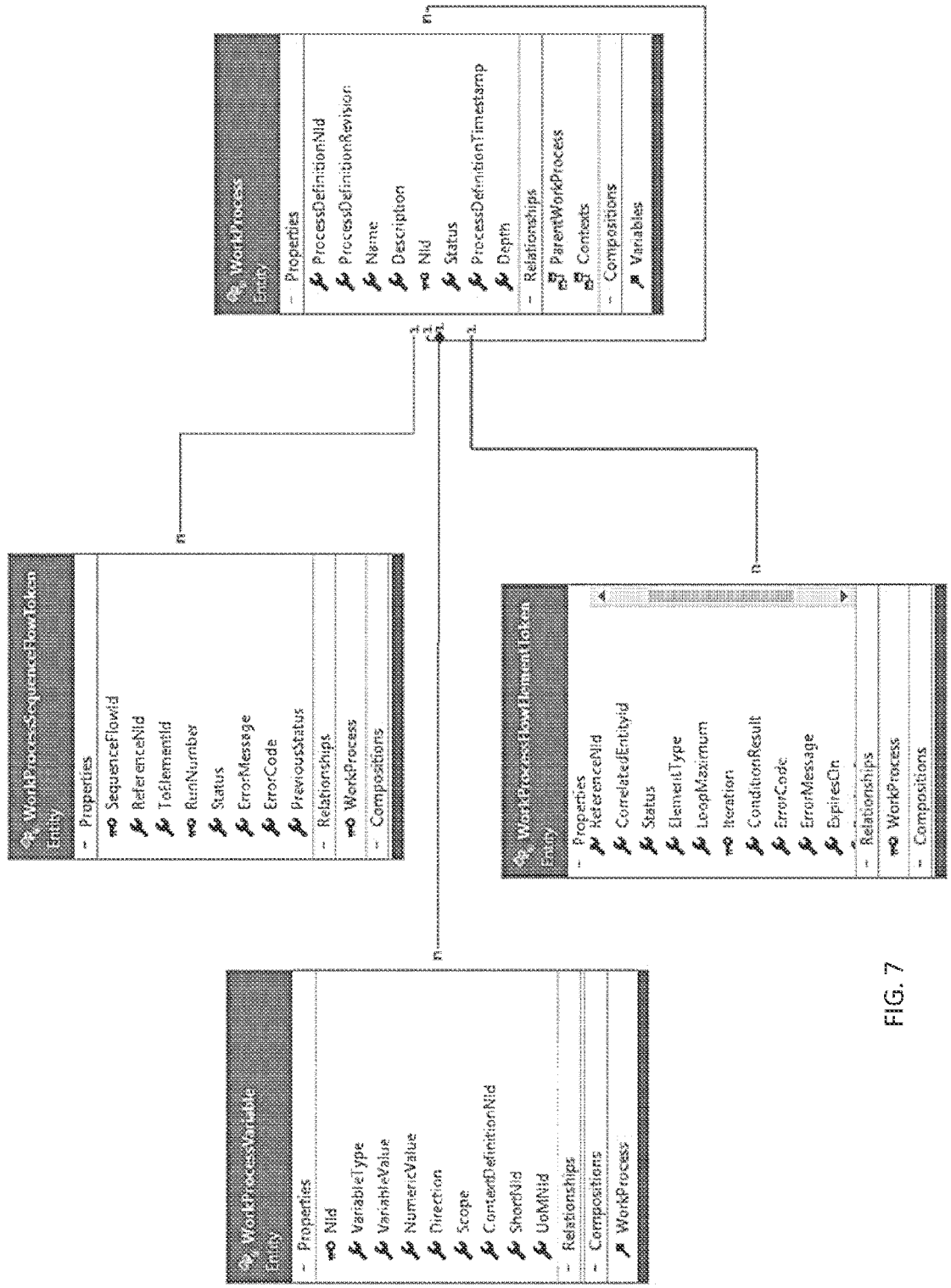
Figure 8:
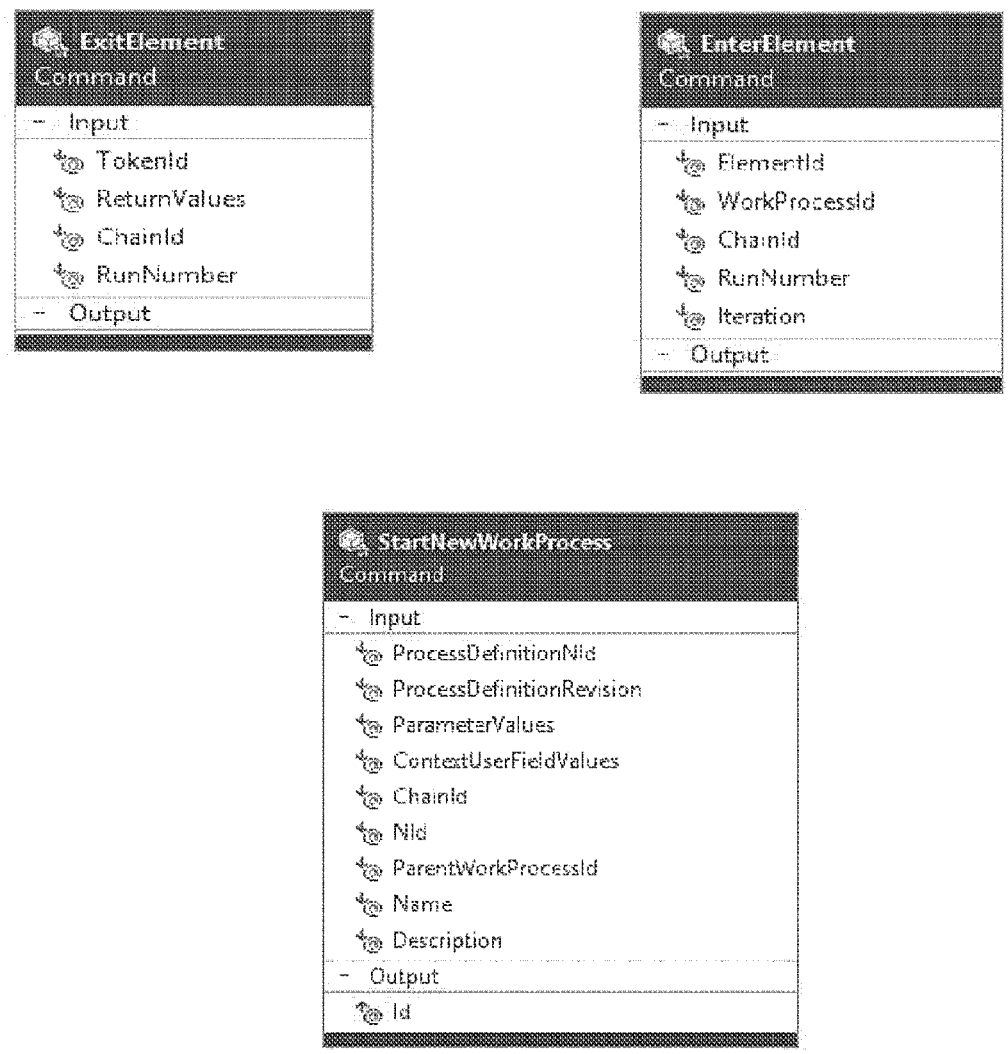

Exchangeable tokens with Boolean values are the means to confine handlers to their surroundings and to make combine gateways freely possible. Taking also into account that tokens are generated for each element of the business process, and not only for a complete run as in the conventional technique, this provides support for handling large-scale models. Actually, at a converging gateway, the use of the conventional run-wide tokens would compel the system to crawl the model back to find the opening diverging gateway (which could be very far from the converging counterpart) to understand whether all branches have been considered and then to move the token from a true branch to the gateway. This requires a lot of time and memory resource, dramatically increasing as the process complexity increases. On the contrary, thanks to the creation of the tokens also for the runs that are not executed, the system is immediately capable of deciding whether or not the token is to be exchanged. This is shown for instance in FIG. 5. Converging gateway CG1 has ready tokens Rt1 (true) and Rt2 (false) on its input sequence flows and this allows the gateway to understand that all branches have been considered. As a consequence, ready tokens Rt1 and Rt2 are exchanged (or consumed), so that consumed tokens Ct1, Ct2 appear on the respective sequence flows and a new ready true token Rt3 is created on CG1. The token exchange will be still further discussed later on.

Dispensing with the need to search for a diverging gateway also allows including into a BPMN graph not only the conventional balanced and symmetrical schemes, i.e. schemes where each diverging gateway has one converging gateway (of the same type as the diverging one in case of symmetrical schemes) gathering all paths departing from the former, but also unbalanced schemes (where a converging gateway gathers only some of the paths departing from a diverging gateway), and asymmetrical schemes, where a converging gateway can be of a type different from the diverging counterpart. Unbalanced and asymmetrical schemes are not shown in the drawings, since their representation is unessential for the understanding of the sequel of the description.

Figure 9:
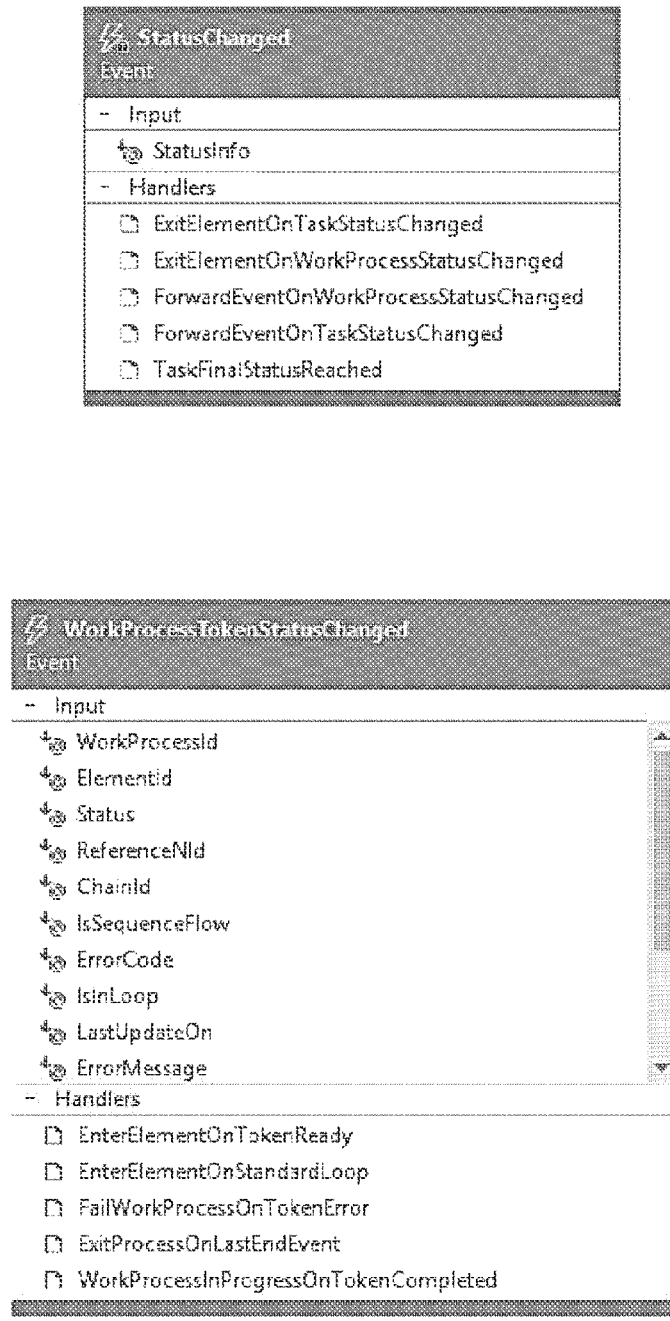

According to feature 7 of the invention, each token includes in its key the number of the run it belongs to. Inclusion of the run number together with the work process identity, the element identity and the iteration (see also FIG. 9) is beneficial to protect referential identity and aids in verifying and maintaining correctness. In particular, in case of loop backs, such a feature allows having loop backs in true branches, while avoiding endless loop-backs on false branches, in that the token is propagated without run number increment. This will be discussed later on.

FIGS. 6 to 10 depict the organization of the entities, commands and handlers involved in the method of the invention when applied to the above mentioned SIT UAF platform. In respect of the token entities, the distinction between sequence flow tokens and flow element tokens mentioned above is to be appreciated, together with the inclusion of the run number in the sequence flow tokens. The distinction between sequence flow tokens and flow element tokens entails that the corresponding sequence flow and flow element can be identified, and to this end an identification field (SequenceFlowId and FlowElementId, respectively) is included.

Note that field FlowElementId does not appear in the Figures. Iteration (in the Flow Element tokens, since only flow elements can be concerned by loops) is an incremental field which is updated at every execution of a task is to be executed multiple times. Moreover, field "Status" includes the actual ready/consumed status of the token and its Boolean value (true/false). The above mentioned identification fields, together with the Run Number and the Iteration form the key of the token. The other fields in the various artifacts shown in the Figures are standard fields, whose meaning is known to the skilled in the art.

Figure 11:
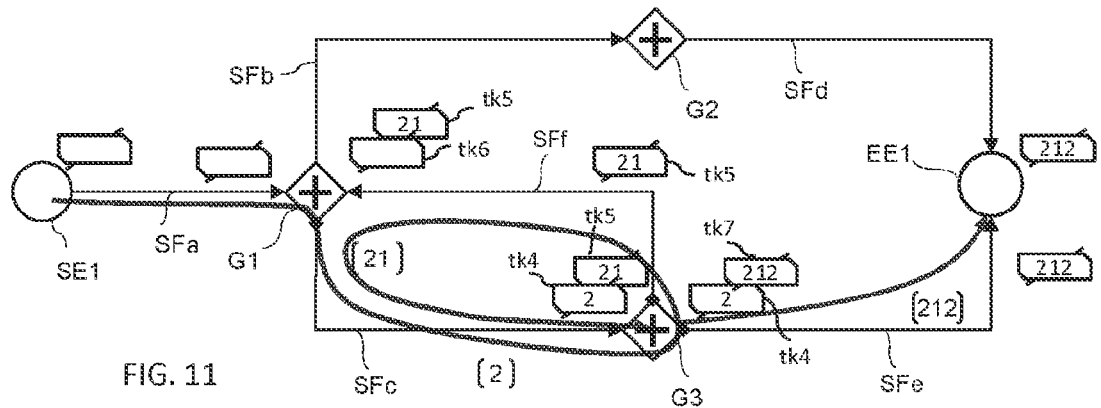
FIGS. 11, 12 are examples of inclusion of the run number into the tokens.
Figure 12:
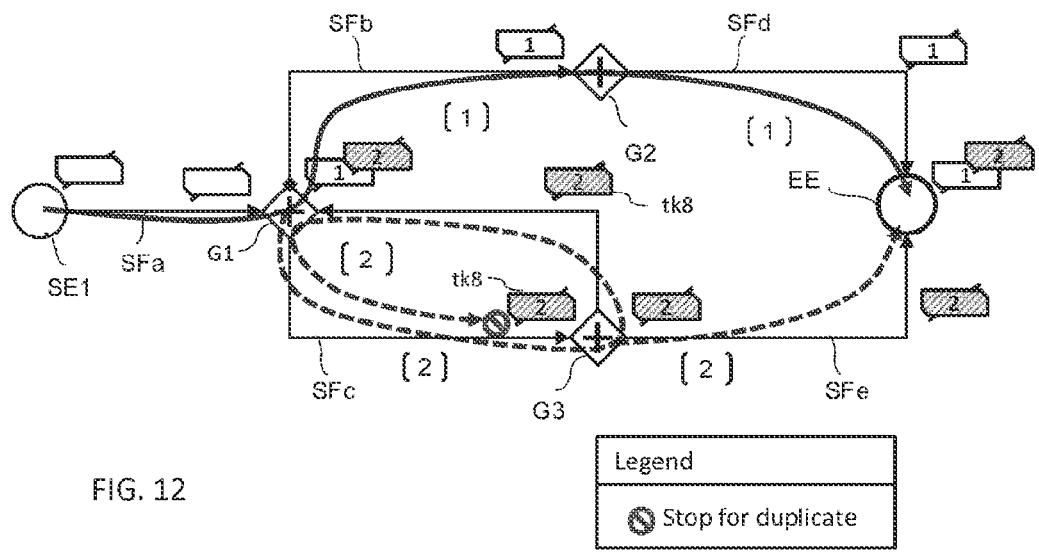

FIGS. 11 and 12 show examples of the use of run number in the tokens in a process like that depicted in FIG. 4. The same reference symbols as in FIG. 4 have been used for the model elements, but the run numbering is somewhat modified, in that the run executing sequence flow SFa has not been numbered, so that the runs exiting G1 are now runs "1" and "2". The numbering of the other runs depends, as said, on the existence of forks and on the runs being true or false. The run number has been reported inside the tokens.

More particularly, FIG. 11 shows the case of a true run on the loop back. Run "1" concerning the upper branch is not shown since is not of interest for this example. Run "2" loops back from G3 to G1 as run "21" along SFf, then returns again to G3 and eventually arrives at end event EE1. Thus, a token tk4 with run number "2" will be generated on sequence flow SFc. When execution arrives the first time at G3 along run "2" and exits G3 along the loop back, a new token tk5 is created and receives run number "21". Thanks to the change of the run number, token tk5 can follow the loop-back without colliding with an existing token tk6 created at the first passage of the execution through the gateway, and reaches gateway G3 again. There, it is exchanged for a token tk7 with run number "212", which can eventually reach EE1.

FIG. 12 shows the case of a true run "1" on the upper branch and false runs "2", "22" on lower branch and the loop back. False token tk8 on the loop-back is not exchanged at gateway G1 for a token "22" that would trigger an endless loop ("22222 . . . "), but is propagated on the loop back with its original run number "2". At gateway G1, it conflicts with the existing token tk9 previously created for run "2", thereby ending any other computation. This is shown by the "stop for duplicate" symbol in the Figure.

Figure 14:
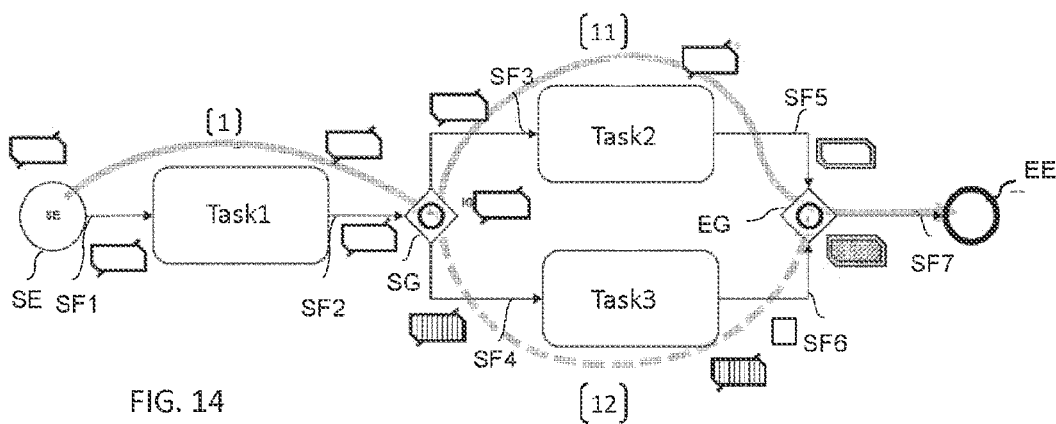
FIG. 14 is a diagram of the transaction segmentation showing the tokens created during the transaction.
Figure 13:
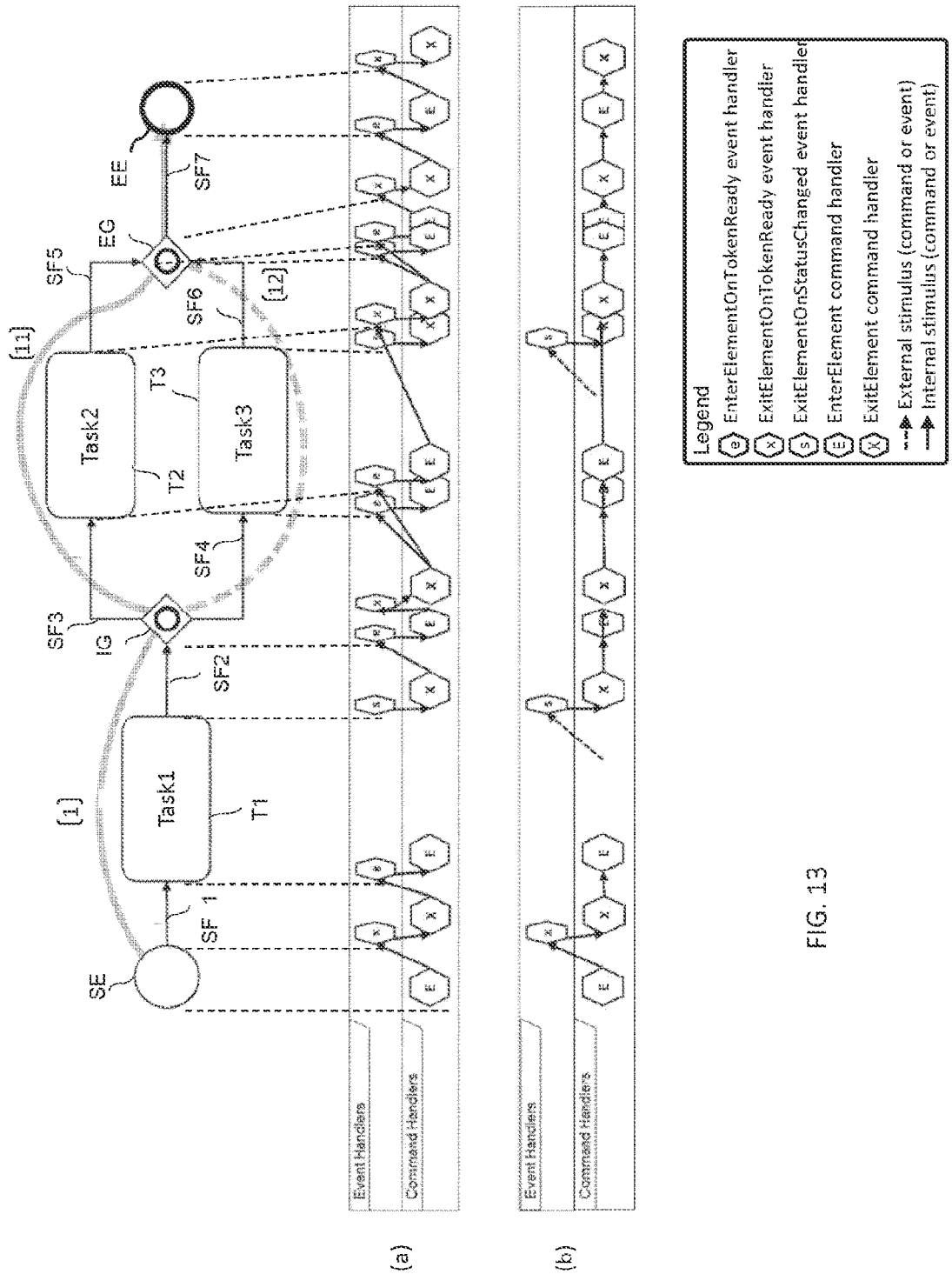
FIG. 13 is a diagram of the transaction segmentation.

FIGS. 13 and 14 illustrate the segmentation (or breakdown) of a transaction in an exemplary process. The exemplary process is similar to that shown in FIG. 2, apart from the fact that the gateways are shown here as inclusive gateways. Further, reference symbols for the sequence flows (SF1 to SF7) have been added. The process demands execution of tasks T1 and T2, whereas task T3 is skipped. The breakdown can be deduced from the handover of the control between event handlers and command handlers at each element (threads (a)). As indicated in the legend, the commands of interest for the invention are the EnterElement and the ExitElement, and the events of interest are the EnterElementOnTokenReady, the ExitElement-OnTokenReady and the ExitElementOnStatusChanged. The EnterElementOnTokenReady event handler is started when a sequence flow token is ready: upon reading the status of the tokens ready on the flow element following the sequence flow, it decides whether the element may be entered. By way of comparison, threads (b) show the non-segmented transaction, as it would occur in the conventional technique.

In more detail, if the flow element is an element where no external activities are needed (a "zero-cost" element, such as a gateway, a start event or an end event), then the EnterElement commits, releasing an event WorkProcessToken-StatusChanged, and the system exits the element creating new sequence flow tokens in the ExitElement command handler; the event WorkProcessTokenStatusChanged is fired for each of them. On the other hand, if the flow element needs that an activity is to be carried out, EnterElement hands over the control to an external program; the enactment will resume when the external activity will reach a final status and the system will fire a StatusChanged event, according to a more conventional external integration pattern.

For further illustrating what has been discussed up to now for the token exchange, FIG. 14 shows the tokens for the transaction of FIG. 13 after execution of task T2 and before EG. The tokens are created and consumed (exchanged) both for the branches actually executed (true runs, here the upper branch) and for the skipped branches (the lower branch). All tokens (even the consumed ones) are stored in a table in the data base of the entities. Thus, for the situation shown in FIG. 14, the following table of tokens will exist in the data base:

TABLE 1

(WorkProcess: "Execution 1", run: "1", element: "SE",
value: "true", status: "consumed", timestamp: "00:00:00")
(WorkProcess: "Execution 1", run: "1", element: "SF1",
value: "true", status: "consumed", timestamp: "00:00:01")
(WorkProcess: "Execution 1", run: "1", element: "T1",
value: "true", status: "consumed", timestamp: "00:00:02")
(WorkProcess: "Execution 1", run: "1", element: "SF2",
value: "true", status: "consumed", timestamp: "00:00:03")
(WorkProcess: "Execution 1", run: "1", element: "IG",
value: "true", status: "consumed", timestamp: "00:00:04")
(WorkProcess: "Execution 1", run: "11", element: "SF3",
value: "true", status: "consumed", timestamp: "00:00:05")
(WorkProcess: "Execution 1", run: "11", element: "T2",
value: "true", status: "consumed", timestamp: "00:00:06")
(WorkProcess: "Execution 1", run: "11", element: "SF5",
value: "true", status: "ready", timestamp: "00:00:07")
(WorkProcess: "Execution 1", run: "12", element: "SF4",
value: "false", status: "consumed", timestamp: "00:00:05")
(WorkProcess: "Execution 1", run: "12", element: "T3",
value: "false", status: "consumed", timestamp: "00:00:06")
(WorkProcess: "Execution 1", run: "12", element: "SF6",
value: "false", status: "ready", timestamp: "00:00:07")

After the exchange at EG of the tokens on SF5 and SF6, the two "ready tokens" change their status to "consumed" and a token for EG is created, so that the following table exists:

TABLE 2

(WorkProcess: "Execution1", run: "1", element: "SE",
value: "true", status: "consumed", timestamp: 00:00:00")
(WorkProcess: "Execution1", run: "1", element: "SF1",
value: "true", status: "consumed", timestamp: 00:00:01")
(WorkProcess: "Execution1", run: "1", element: "T1",
value: "true", status: "consumed", timestamp: 00:00:02")
(WorkProcess: "Execution1", run: "1", element: "SF2",
value: "true", status: "consumed", timestamp: 00:00:03")
(WorkProcess: "Execution1", run: "1", element: "IG",
value: "true", status: "consumed", timestamp: 00:00:04")
(WorkProcess: "Execution1", run: "11", element: "SF3",
value: "true", status: "consumed", timestamp: 00:00:06")
(WorkProcess: "Execution1", run: "11", element: "T2",
value: "true", status: "consumed", timestamp: 00:00:07")
(WorkProcess: "Execution1", run: "11", element: "SF5",
value: "true", status: "consumed", timestamp: 00:00:09")
(WorkProcess: "Execution1", run: "12", element: "SF4",
value: "false", status: "consumed", timestamp: 00:00:04")
(WorkProcess: "Execution1", run: "12", element: "T3",
value: "false", status: "consumed", timestamp: 00:00:06")
(WorkProcess: "Execution1", run: "12", element: "SF6",
value: "false", status: "consumed", timestamp: 00:00:09")
(WorkProcess: "Execution1", run: "11", element: "EG",
value: "false", status: "ready", timestamp: 00:00:10")

As said before, feature 4 is one of the features assisting in transposing the traditional inference concepts to an event-driven architecture. Inference (i.e. changing the status of a larger entity when all contained entities have changed their status) is a problem that must be solved with the non-trivial technique of moving the logics to a dedicated event-handler after the end of the transaction. Conventionally, the ExitElement command handler decides if and how to proceed on the basis of a necessary and sufficient condition. In the approach according to the invention, the EnterElement-OnToken-Ready event handler evaluates a necessary ("MayEnter") condition and the EnterElement command handler verifies the whole condition and states how to proceed: by a true exchange, a false exchange or a no-action.

Figure 15:
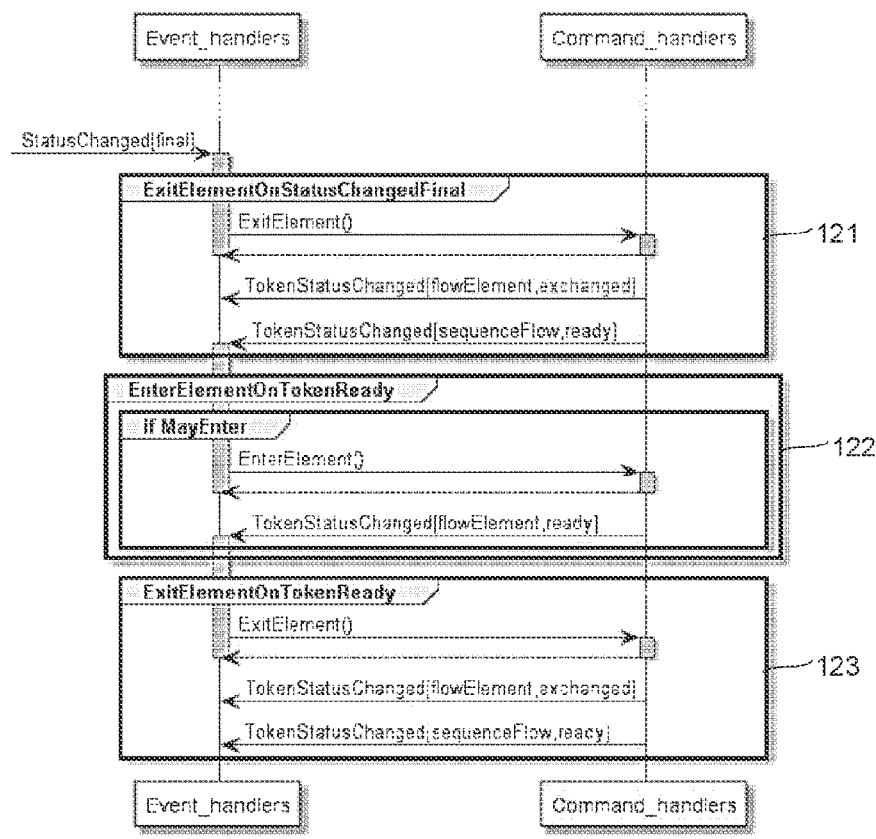
FIGS. 15, 16A, 16B are timing charts of events, commands and handlers in the execution of the business process depicted in FIGS. 13, 14 when using transaction segmentation.

FIG. 15 shows this approach for a StatusChanged(final) event. When such an event occurs, the ExitElementOnStatusChanged-Final event handler issues command ExitElement towards the command handlers. The relevant token exchange between a flow element and a sequence flow takes place and the command handlers react with TokenStatusChanged(flowElement, exchanged) and TokenStatusChanged(sequenceFlow, ready) events (step 121). The following EnterElementOnTokenReady event handler evaluates if the element may be entered and, in the affirmative, it emits the EnterElement command, to which the command handlers react with TokenStatusChanged (flowElement, ready) event (step 122). Upon the occurrence of that event, at step 124 a procedure like that shown in step 121 is performed.

Figure 16A:
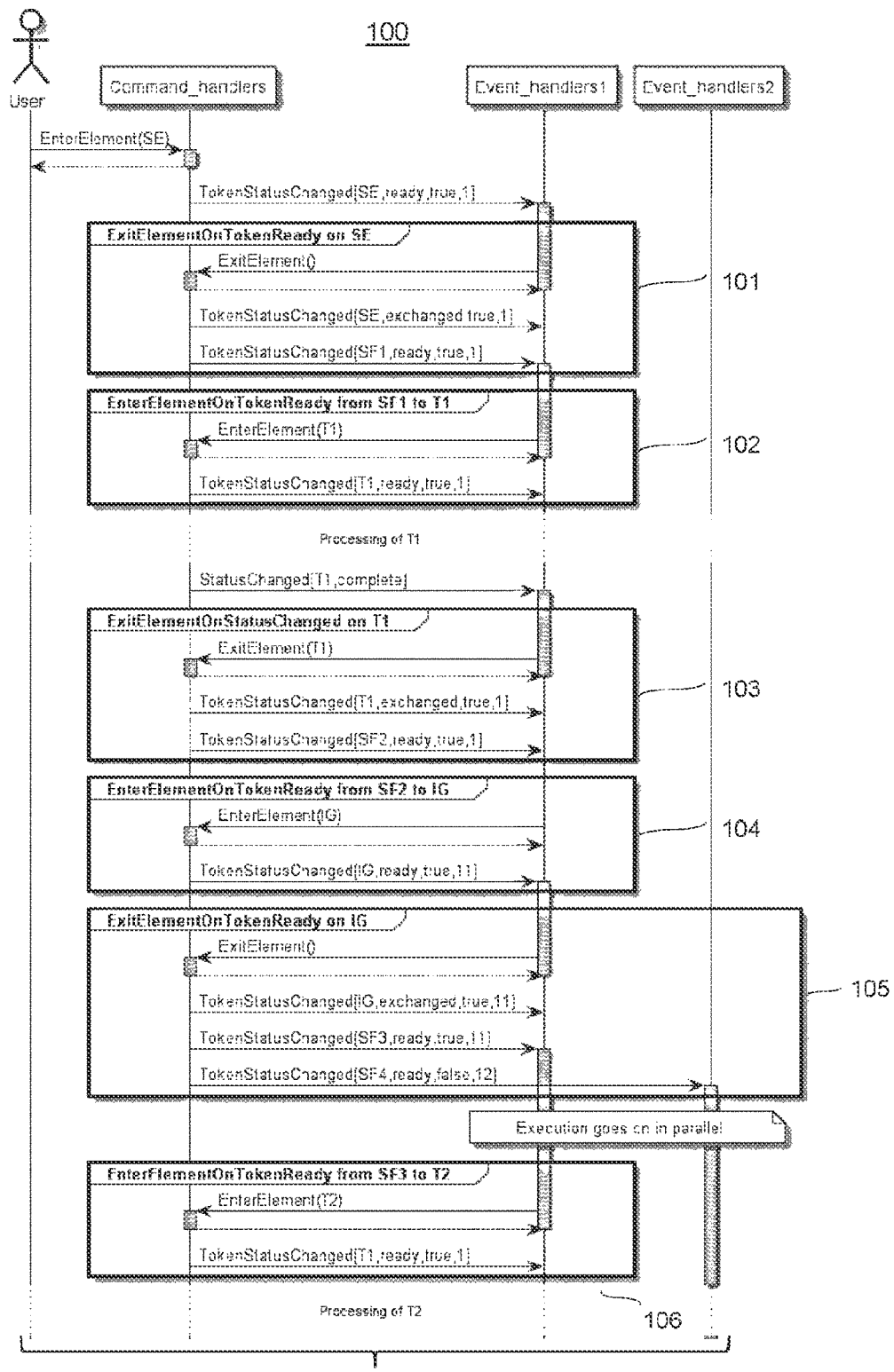
Figure 16B:
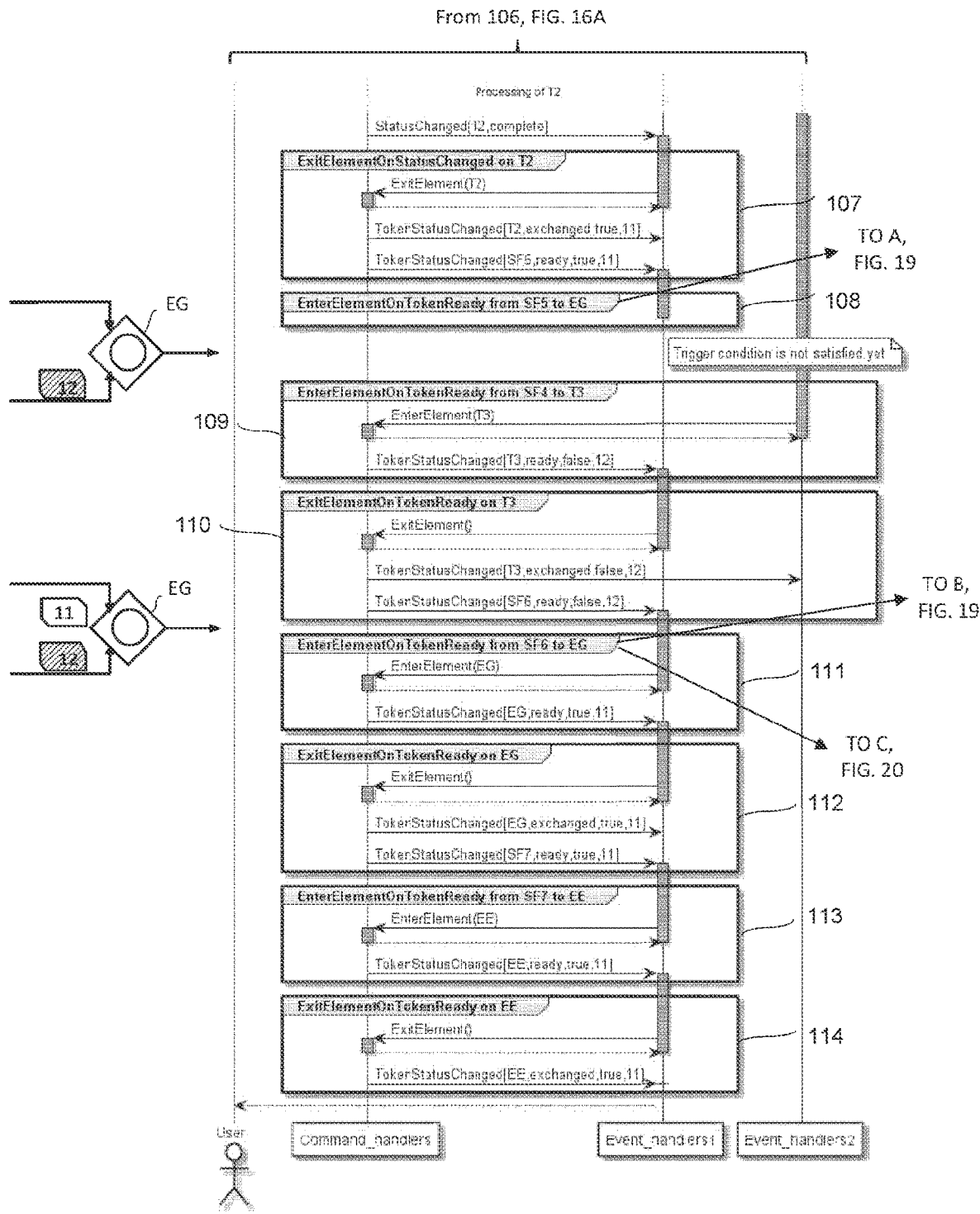

The saga for the segmented transaction shown in FIGS. 13, 14 is depicted in FIGS. 16A, 16B. There, in the various steps, ExitElement and EnterElement events alternately occur and give rise to corresponding ExitElement and EnterElement commands, respectively. Execution of the commands will result in the generation of proper true/false, ready/consumed tokens and the launching of corresponding TokenStatusChanged events.

The parenthetical indications in each command/event indicate, in the order, the element concerned (SE, SF1, T1 . . . ), the value (true/false) and the status (ready/consumed) of the token, and the run (1, 11, 12 . . . ), as in Tables 1, 2 above.

Execution is started by EnterElement command from the user. In response to the command, a ready true token relevant to SE and run "1" is generated and the corresponding event TokenStatusChanged is launched to the event handler (Event_Handler1). In Step 101, the commands/events relevant to process execution on SE are shown. Event_Handler1 sends an ExitElement command to the Command handlers, and consequently an exchanged true token for SE and a ready true token for sequence flow SF1 are generated (event TokenStatus-Changed(SE), Exchanged, true, 1). Then, the process is to pass to task T1 (event EnterElementOnTokenReady from SF1 to T1, step 102). Event_Handler1 sends EnterElement(T1) command and consequently event TokenStatusChanged(T1, ready, true,1) takes place. At this point, processing of T1 takes place. When such a processing is complete (what is signaled by a corresponding StatusChanged event, the processing goes on with the operations requested by the status change in T1 (events ExitElementOnStatusChanged on T1, EnterElement-OnTokenReady from SF2 to IG and ExitElementOnTokenReady on IG, steps 103 to 105). More particularly, the sequence of commands/events in steps 103, 104 is similar to that shown in steps 101, 102, with the difference that the elements concerned are T1 and SF2 (step 103) and SF2 and IG (step 104). Step 105 instead takes into account that IG is a diverging gateway, wherefrom runs "11" (true) and "12" (false) exit: thus, the events will concern generation of a consumed and a ready true token for run "11", as for previous run "1", and of a false token for run "12". Of course, at this point of the execution, the TokenStatus-Changed events for run "11" concern IG and SF3, and the TokenStatusChanged event for run "12" concerns SF4. The operations for the two runs then go on in parallel.

Execution of run "11" includes steps 106 and 107 similar to steps 102, 103 and processing of T2 therebetween. In step 108, a true token is ready at end gateway EG: yet, the presence of the only token of the true run indicates that operations concerning run "12" are not yet complete ("Trigger condition is not satisfied yet") so that the true token cannot yet be exchanged on EG. Steps 109, 110 refer to the processing of false run "12", which is substantially similar to that of true run "11", except that the tokens concerned are false and no processing of T3 takes places. At step 111 also the false token has arrived (event EnterElement-OnToken-Ready from SF6 to EG) and the true token is ready. Steps 113 to 114 leading from exit gateway EG to end event EE include events/commands equivalent to those included in the EnterElementOnTokenReady/ExitElementOnTokenReady events discussed above.

Figure 17:
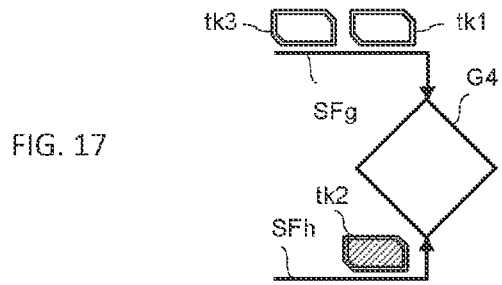
FIG. 17 is a diagram of the filtering based on the arrival order of the tokens at a converging gateway.
Figure 18:
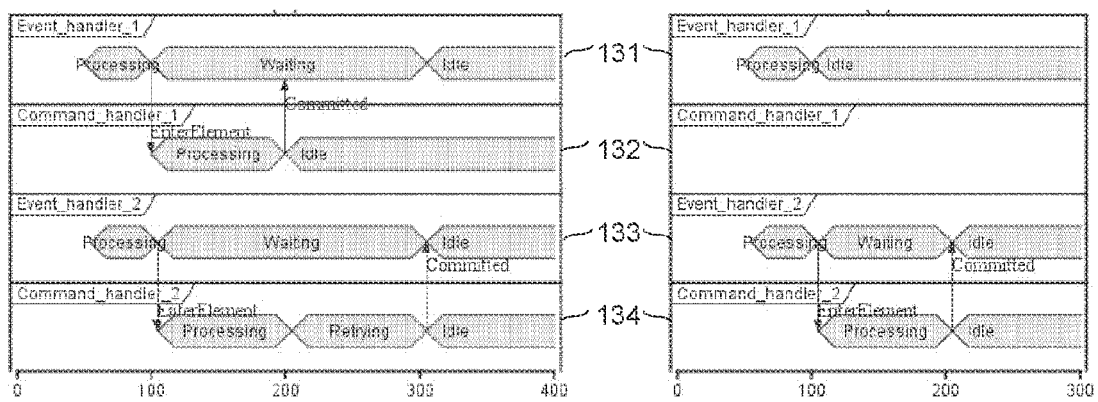
FIG. 18 is a comparison of the performance of the system without and with the filtering of FIG. 17.

FIGS. 17 and 18 depict the optimization of the filters in the event handler provided for by feature 5, whereby the EnterElement command is called only when the last triggering incoming token is ready. Also tokens eclipsed by other previous tokens trigger the command handler to let it evaluate the situation after all commits. This optimization exploits the concept of "First-in-Line" and "Not-First-in-Line" token: "First-in-Line" denotes the oldest token on each sequence flow, and "Not-First-in-Line" denotes the tokens arriving on a sequence flow after the First-in-Line. The technique of limiting the command/event must not include tokens that are not "First-in-Line".

FIG. 17 shows a gateway G4 receiving true tokens tk1, tk3 on one entering sequence flow SFg and token tk2 on the other sequence flow SFh. Assuming that the order of arrival at G4 is tk1, tk2, tk3, then tk1 and tk2 are "First-in-Line" (tk2 can be referred to as the "last First-in-Line", being arrived after tk1 but on a different sequence flow), and tk3 is "Not-First-in-Line".

FIG. 18 is a chart showing the event/command handlers in the situation depicted in FIG. 17 in the absence (diagram (a)) and in the presence (diagram (b)) of the optimization. Two concurrent tokens ready substantially at the same time, e.g. tk1 and tk2, are considered, and the chart shows a respective pair of event and command handlers 131, 132 (handler_1) and 133, 134 (handler_2). In the conventional technique shown in diagram (a), at the end of the event processing, both event handlers generate command EnterElement, which has to consume the respective token in order to exchange it with a new ready token on gateway G4. Both event handlers are therefore to wait for the processing of the command by the respective command handler before returning idle. Command_handler_1 intervening first is successful in exchanging token tk1 and commits the transaction at the end of the processing. Command_handler_2 attempts completing the transaction (processing), but it fails and at the end of the attempt it retries the exchange (retrying). At the second attempt, it realizes that it has nothing to do and commits the transaction. In the presence of the optimization, Event handler_1 does not generate the command because token tk1 is not the last, so that there is no waiting time for command processing by Command_handler_1 or for a retry by Command_handler_2, with a clear saving of time and resources.

Besides such saving of time and resources, the described optimization allows avoiding loss of tokens that are not "First-in-line" in case of high concurrency. Moreover, in case of inference, the "Last-First-In-Line" or "Not-First-In- Line" technique is a practice that can be applied without further complications, providing a quick compromise.

A similar check is performed inside the EnterElement command handler, to decide whether the token exchange is taking place on a true or false path (Feature 6). In case of exclusive gateways on a true path, the event handler passes the ID of the triggering token to EnterElement as a hint, but if another transaction has consumed it in the meantime, the oldest ready true token is consumed. In other words, run number can still be used as a hint for exclusive gateways, to avoid concurrency in trying to consume the oldest one of more than one true token.

Also this check assists in improving operation correctness, by avoiding exchanging twice the same token being misled by an event handler, and in improving performance, in that trying to exchange the token that triggered the event handler avoids unneeded concurrency. Moreover, a deterministic design is achieved, in that idle pauses ("sleeps") to let other commands commit—as often occurs in prior art—are avoided and the right behavior in case of different overlapping behaviors is achieved. Also, moving decisions to the last command handler in case of inference is a practice that can be applied without further complications and allows having consistent micro-transactions/business logics inside command handlers.

The problem of implementing concurrent inference in a transactional Event-Driven Architecture dealt with features 4 to 6 is wider than the process enactment, encompassing subjects like:
- change a production order status when all its operations have been completed;
- change a work process status to complete when all its elements (tokens) have been completed correctly;
- change a work process status to complete with errors when all its elements (tokens) have been completed but some of them are in error.

Figure 19:
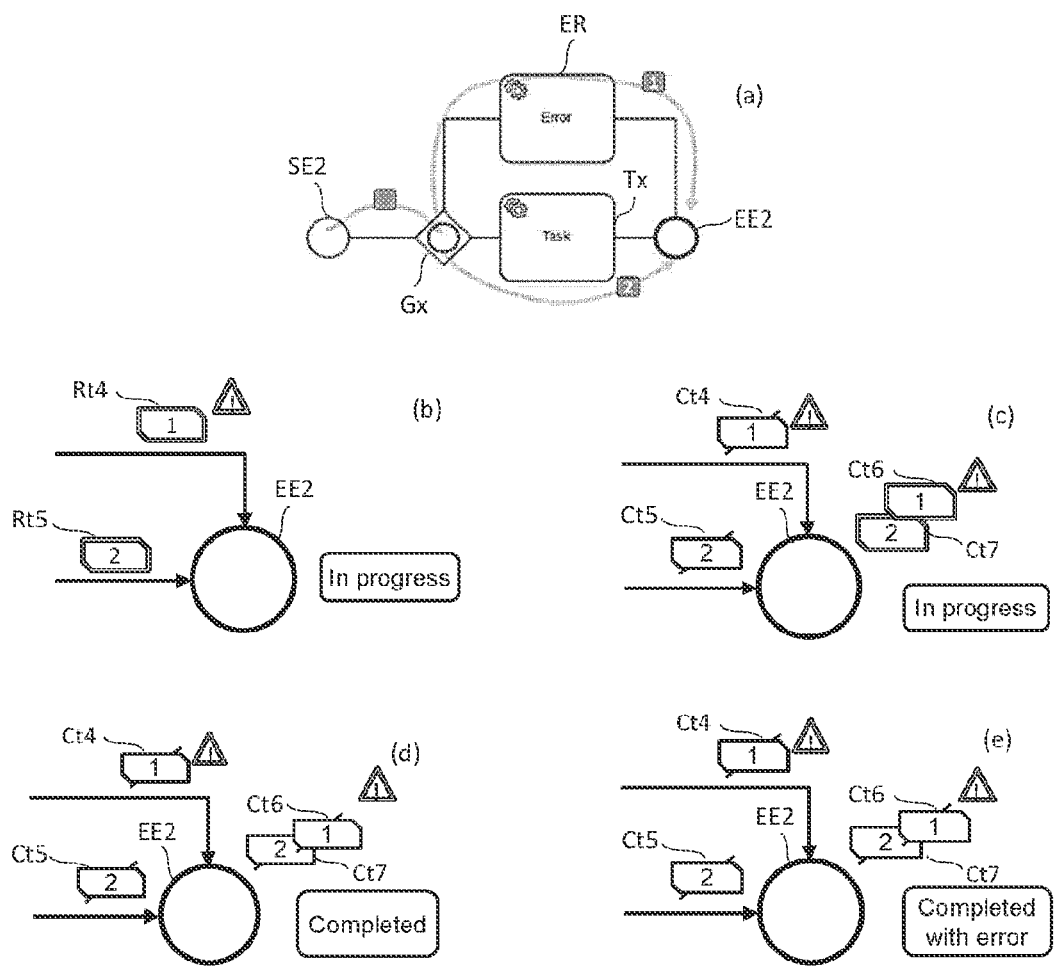
FIG. 19 are diagrams of the implementation of concurrent inference.

An example of the use of such features in the latter case is shown in FIG. 19. A process with two runs "1" and "2" is shown, where execution of run "1" is affected by error (sketch (a)). The error is indicated by the "danger" symbol. Thus, a ready token with error Rt4 and a correct ready token Rt5 arrive at end event EE2 (sketch (b)): each token will be consumed as usual (becoming consumed token Ct4, Ct5, respectively) and new ready tokens Rt6, Rt7 (with and without error) are created on EE2 (sketch (c)). When also such tokens have been consumed (Rt6, Rt7 have become consumed tokens Ct6, Ct7 as shown in sketches (d) and (e)), it is possible to leave the "In progress" condition of the process indicated at sketch (c). Depending on the status of the tokens, it is decided whether the process is "Completed" (sketch (d)) or "Completed with error" (sketch (e)). More particularly:
- if the check on the tokens is made in the same transaction as that of the "EnterElement" handler, it is likely that no handler sees the condition of all tokens having been consumed, and the overall status does not change;
- if on the contrary the check is left to another transaction, the above condition is seen by one of the handlers, but if this one is guided by the "correct" token, such a value will be propagate and the process will be erroneously set to "Complete";
- the correct design is when the situation of all tokens is checked, so that, due to the detection of token with error, a "completed with error" status will be assumed.

Figure 20:
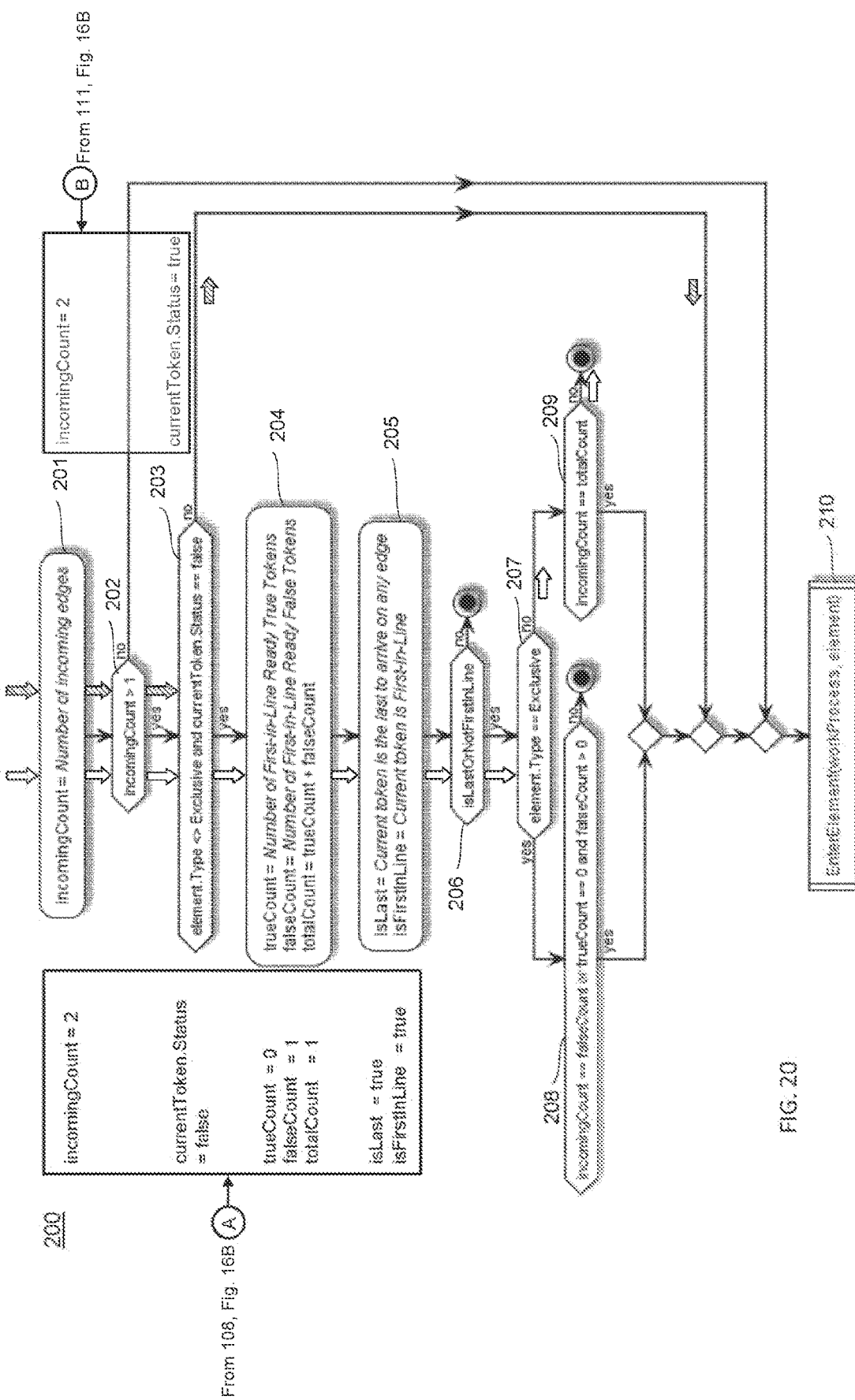
FIG. 20 is a flow chart of the implementation of the EnterElementOnTokenReady event handler.

FIG. 20 shows a flow chart 200 of the algorithm implementing the EnterElementOnTokenReady event handler associated with the WorkProcessTokenStatusChanged. The handler is optimized to comply with all features. As usual, the concept of exclusive gateway encompasses all flow elements different from inclusive or parallel gateways. In flow chart 200, blocks 201, 204, 205 contain definitions of the variables (assignments) considered during implementation, said assignments being self-explanatory in view of the previous description.

At the first operating step 202, it is checked whether more than one incoming edge exists. In the negative, the EnterElement command is immediately issued (step 210). In the affirmative, it is checked whether the element is a gateway other than an exclusive one and the token is false (step 203). In the negative, the EnterElement command is again immediately issued. In the affirmative, it is checked whether the current token is the last to arrive on any edge or is a first-in-line token (step 206). In the negative, the process ends. In the affirmative, it is checked whether the element is an exclusive gateway (step 207). In the affirmative, it is checked whether all first-in-line ready tokens are false (step 208) and, in the negative, it is checked whether all tokens have been processed (step 209). Upon a positive outcome of both checks, the EnterElement command is issued, whereas in the negative the process ends.

It is to be appreciated that the operational flow shown in the Figure is run along in different manner depending on the specific circumstances. FIG. 20 highlights the steps actually executed in implementing the handler in case of steps 108 (double line blank arrows) and 111 (double line dashed arrows) of FIG. 16B. The conditions occurring in such steps are indicated in blocks A and B, respectively.

Figure 21:
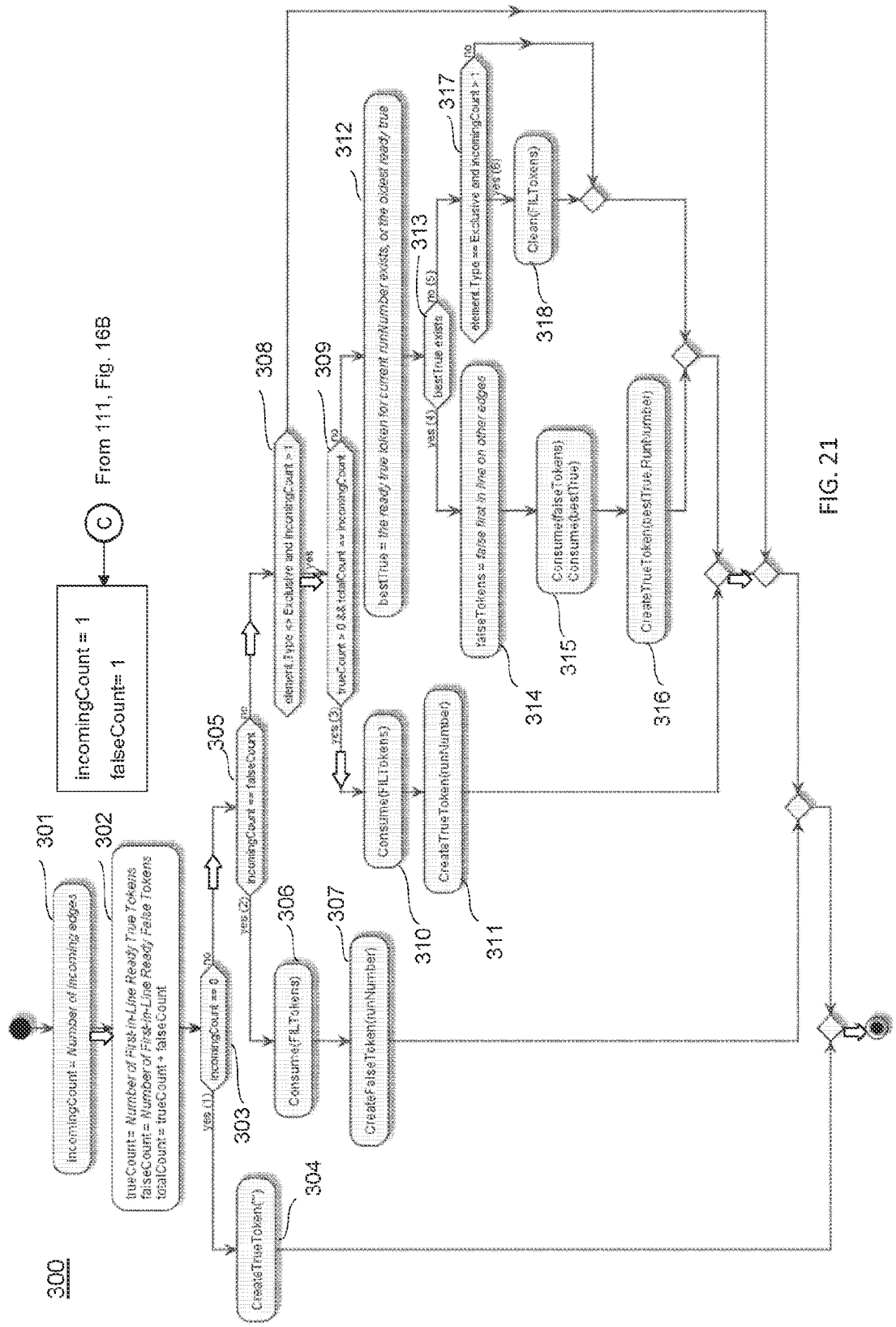
FIG. 21 is a flow chart of the implementation of the EnterElement command handler.

FIG. 21 shows a flow chart 300 of the algorithm implementing the EnterElement command handler in order to exchange incoming ready tokens. Exchange is a mix of Consume (the old tokens pass from "ready" to "consumed") and Create (the new token is created with the correct run number on the flow element) operations. The following cases of exchange are possible at a flow element:
(1) Start exchange (initialization);
(2) Full false exchange (propagation of false tokens): the entrance is triggered by a false token on each incoming sequence flow;
(3) Full true exchange: the entrance is triggered by a true token on each incoming sequence flow;
(4) Single true exchange: the entrance is triggered by a true token, typically on an exclusive converging gateway;
(5) No exchange.

The exchange algorithm also provides for a cleaning of false tokens left unconsumed at an exclusive converging gateway. Cleaning is useful when, due to the non deterministic nature of the event delivery, a true token arrives before a false token at the gateway. This will be discussed in greater detail further on. Such a cleaning is marked (6) in the flow chart.

The above numbering of the different cases of exchange and of the cleaning step is reported also on the flow chart, at the proper output of the corresponding decision steps.

It has already been said that, when a new token is created upon an exchange, it is assigned a run number according to the run number creation rules discussed in general manner above. As to flow elements, the result of the run number assignment is as follows:
(1) Start exchange: the run number is initialized to an empty string; start exchange will take place at a start event of a transaction
(2) Full False exchange: the run number is the one passed by the caller (the current);

(3) Full True exchange: the run number is the one passed by the caller (the current);

(4) Single true exchange: the run number is the one of the best true token, i.e. the one passed by the caller or, if the token was already consumed, the run number of the oldest ready true token on the edges;

(5) No exchange: no creation of new tokens.

As to sequence flows, the result of the run number assignment is as follows:

(a) for true tokens on a flow element from which the sequence flow departs, the run number of the flow element is suffixed with a monotone digit representing the outgoing edge, unless there is only one outgoing edge, in which case no suffixing is done;

(b) for false tokens on the flow element, the run number is propagated as it is.

Figure 22:
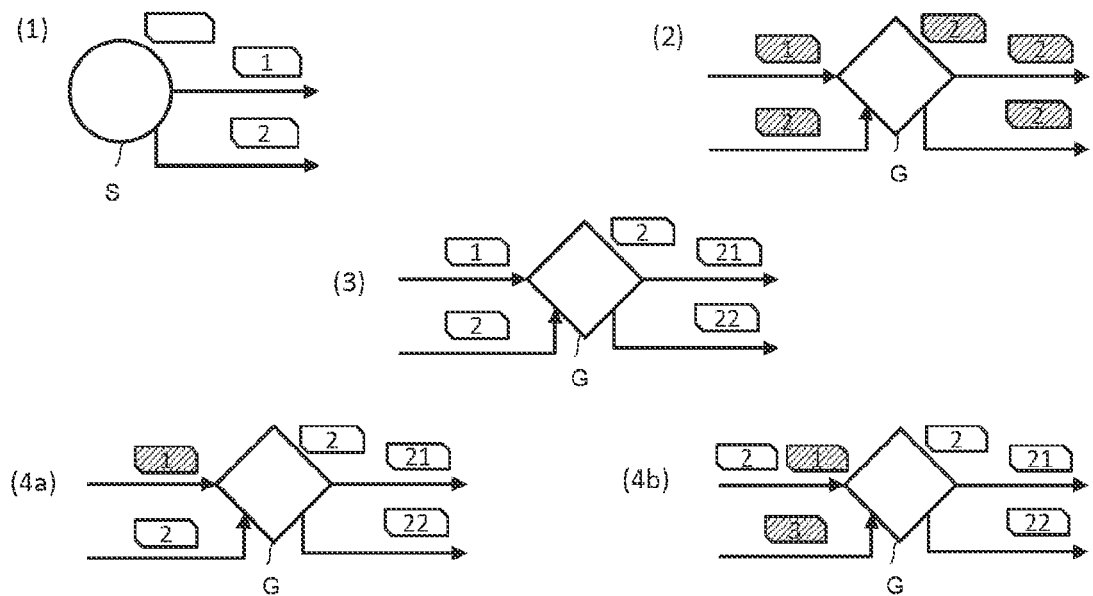
FIG. 22 shows some examples of token exchange.

The tokens for the different cases of exchange are shown in FIG. 22. Sketches (1) to (3) depict the homonymous cases and sketches (4a), (4b) depict the two alternatives of case 4. A start event S with two output sequence flows and a generic gateway G with two input and two output sequence flows are considered. Sketches (2) and (3) assume that token 2 arrives last: thus, token "2" causes the gateway triggering and propagates on the two output sequence flows with run number "2" for the full false exchange and run numbers "21", "22" for the full true exchange. In sketches (4a) and (4b), token "2" is the only true token and therefore it causes the gateway triggering, independently of the order of arrival; the tokens on the output sequence flows are tokens "21" and "22" as in case (3).

Turning back to FIG. 21, in flow chart 300 blocks 301, 302, 312 and 314 contain the assignments, they too being self-explanatory in view of the previous description. At initial step 303, it is checked whether the incoming count is 0. A positive outcome of the check indicates the start and results in the creation of a true token with the initialized run number (step 304) and no further operation is required. In case of a negative outcome of check 303, it is checked whether the first-in-line (FIL) ready tokens on the edge being processed are false (step 305). The positive outcome corresponds to case (2) and results in the consumption of the FIL (First-In-Line) tokens (step 306) and the creation of a false token with the proper run number (step 307). In case of a negative outcome of check 303, it is checked whether the element is a gateway other than an exclusive one and the incoming edge is the first one (step 308). In the negative, no further operation is required. In the affirmative, it is checked whether FIL ready true tokens exists and the total number of tokens corresponds to the number of edges (step 309). The positive outcome corresponds to case (4) and results in the consumption of the FIL tokens (step 310) and the creation of a new true token with the proper run number (step 311). In case of a negative outcome of check 309, it is checked (step 313) whether a best true token exists (where "best true token" indicates the ready true token for the current edge or, in the absence thereof, the oldest true token). The positive and negative outcome of the check correspond to cases (4) and (5) respectively. In case (4), the false FIL tokens on other edges and the best true token are consumed (step 315) and a new true token with the same run number as the best true token is created (step 316). In case (5), the same check as in step 208 is performed (step 317) and, in case of positive outcome, the cleaning mentioned above is performed (step 318). No further operation is required after step 318 or In case of negative outcome of check 317.

Similarly to FIG. 20, FIG. 21 highlights the specific implementation of the algorithm for step 111 of FIG. 16B (double line blank arrows). The conditions occurring in such step are indicated in block C.

Figure 23:
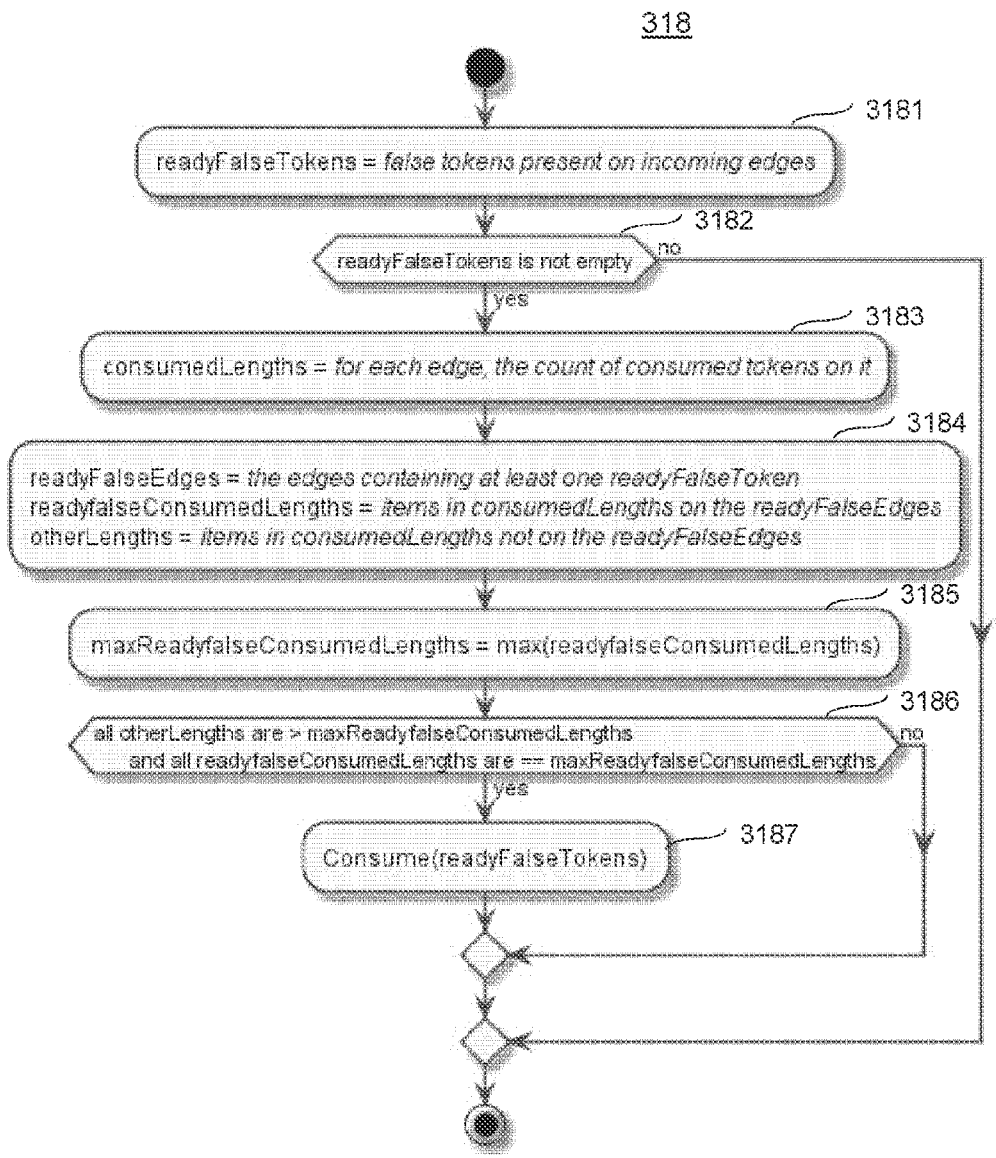
FIG. 23 is a flow chart of the gateway cleaning algorithm.

FIG. 23 shows a flow chart of the cleaning algorithm of step 318. Blocks 3181 and 3183 to 3185 contain the assignments, which also in this flow chart are self-explanatory. In the first operating step 3181, it is checked whether false tokens are present and ready on incoming edges. In the negative, no further operation is required. In the affirmative, it is checked (step 3186) whether all edges containing ready false token (readyFalseEdges) contain the same number of consumed tokens [which number is referred to as max (ReadyFalse-ConsumedLengths), where ReadyFalseConsumedLengths has the meaning defined in blocks 3183 and 3184] and less consumed tokens than other edges. In the negative, no further operation is required. In the affirmative, the ready false tokens are consumed (step 3187) and the operations stop.

Figure 24:
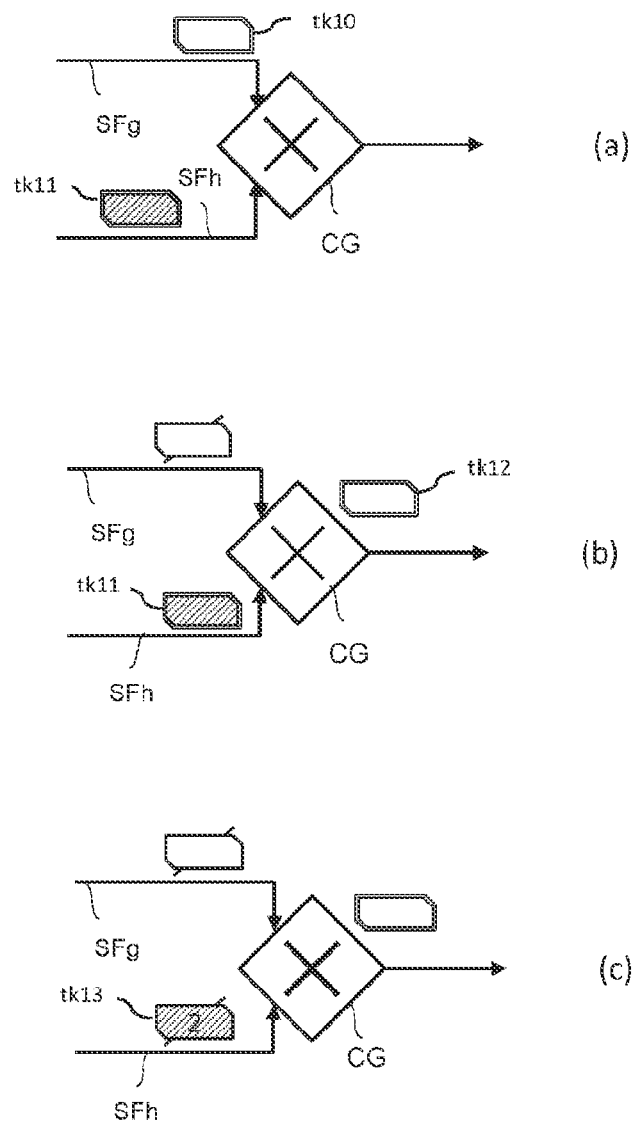
FIG. 24 shows some examples of the cleaning of false tokens.

FIG. 24 shows an example of a situation where cleaning of false tokens may occur. As said, cleaning is useful when a true token arrives before a false token at the gateway. Indeed, taking into account the existence also of the "false" tokens, the triggering condition of a converging gateway is not only the reception of one true token, but also the reception of a totality of false tokens. Normally, execution of false runs is quicker than that of true runs, so that, under such conditions, when the true token arrives, it consumes all false tokens so that no anomaly occurs. If on the contrary, due to the stochastic nature of the event delivery the true token arrives first, it triggers the exchange at the gateway and the false token(s) arriving later remain unconsumed, so that the final state could remain undetermined. With reference to the Figure a true token tk10 arrives at converging exclusive gateway CG before false sequence flow token tk11 (sketch (a)). In the presence of a true token, the exchange algorithm should consume all present tokens, but in this case only tk10 is exchanged to gateway token tk12 (sketch (b)), since false token tk11 has been created later and the handler cannot see it yet. Starting from this situation, feature 8 detects the presence of consumed true token tk10 and consumes false token tk11, thereby avoiding any nondeterministic behavior of the system The advantages of the invention over the state of the art have been discussed above.

Variants of the preferred embodiment described here are possible without departing from the scope of the invention. In particular, EnterElement can immediately call ExitElement for "zero-cost" flow elements. Moreover, the cleaning of feature 8 can be dispensed with by prioritizing the processing of WorkProcessTokenChanged events concerning a false token with respect to event of the same type regarding true tokens.

The invention claimed is:

1. A method of enacting a business process in a production facility employing a computer-managed manufacturing execution system (MES) or a manufacturing operation management system (MOM), wherein the MES system or MOM system operates in an event-driven environment based on handlers orchestrated by events, the method comprising the following steps:

providing a model of the business process;

parsing the model of the business process;

creating, as a result of the parsing, precompiled, closed source command handlers and event handlers;

creating entities of a work process model in an operational domain of the system; and based on the work process model, running a work process instancing the business process by using the precompiled, closed source command handlers and event handlers, the command handlers working on tokens that are differentiated for different types of elements in the work process model, that are created by the command handlers for each element in a run provided for by an enactment thereof and, for each element, are that differentiated according to whether the run to which the token belongs is actually executed or is skipped.

2. The method according to claim 1, which comprises attributing a Boolean value to each token in order to distinguish whether the run to which the token belongs is actually executed or is skipped.

3. The method according to claim 1, which comprises handing over operation control between event handlers and command handlers at each element in the process.

4. The method according to claim 1, which comprising making a decision on an action to be carried out on tokens at a gateway based on an order of arrival of the tokens at the gateway.

5. The method according to claim 4, wherein making the decision results in a command of entering the token only when a last incoming token suitable to trigger the action is ready.

6. The method according to claim 1, further comprising a step of taking a decision on an action to be carried out on a token at a gateway based on a Boolean value of the token itself.

7. The method according to claim 1, further comprising a step of including into each token a code identifying the run to which the token belongs.

8. The method according to claim 1, further comprising a step of analyzing Boolean values and a status of the tokens at a converging exclusive gateway, and a step of consuming tokens belonging to a skipped run and left unconsumed because of a previous arrival of a token belonging to an actually executed run.

9. The method according to claim 1, further comprising a step of assigning priority to the processing of events concerning change of status of tokens belonging to skipped runs over events concerning tokens belonging to actually executed runs.

10. A system, comprising a processor configured for performing the steps of the method according to claim 1.

11. A computer program product comprising non-transitory computer code for performing the steps of the method according to claim 1.

* * * * *